United States Patent
Kubo et al.

(10) Patent No.: US 7,847,045 B2
(45) Date of Patent: Dec. 7, 2010

(54) ACRYLIC ACID-BASED POLYMER AND METHOD OF PRODUCING THE SAME

(75) Inventors: Hideo Kubo, Ichihara (JP); Hitoshi Matsumoto, Chiba (JP); Takeshi Shimotori, Ichihara (JP); Tooru Kawabe, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 322 days.

(21) Appl. No.: 11/921,432

(22) PCT Filed: Jun. 13, 2006

(86) PCT No.: PCT/JP2006/311848
§ 371 (c)(1),
(2), (4) Date: Nov. 30, 2007

(87) PCT Pub. No.: WO2006/134925
PCT Pub. Date: Dec. 21, 2006

(65) Prior Publication Data
US 2009/0111961 A1  Apr. 30, 2009

(30) Foreign Application Priority Data

Jun. 15, 2005 (JP) .............................. 2005-175804
Jun. 15, 2005 (JP) .............................. 2005-175808
Jun. 15, 2005 (JP) .............................. 2005-175810

(51) Int. Cl.
*C08F 124/00* (2006.01)
*C08F 120/06* (2006.01)
*C08G 63/08* (2006.01)

(52) U.S. Cl. ..................... 526/266; 526/317.1; 526/319; 528/354

(58) Field of Classification Search ................ 526/266, 526/317.1, 319; 528/354
See application file for complete search history.

(56) References Cited

U.S. PATENT DOCUMENTS 5,098,959 A  3/1992  McGrath et al.
5,756,585 A  5/1998  Teyssie et al.

FOREIGN PATENT DOCUMENTS

| EP | 0 936 225 | 8/1999 |
| EP | 1 752 479 | 2/2007 |
| EP | 1752479 A1 * | 2/2007 |
| JP | 10-8013 | 1/1998 |
| JP | 11-29617 | 2/1999 |
| JP | 11-109632 | 4/1999 |
| JP | 2003-082010 | 3/2003 |
| JP | 2006-70229 | 3/2006 |
| WO | WO 96/23012 | 8/1996 |
| WO | WO 2005/116098 | 12/2005 |
| WO | WO 2005116098 A1 * | 12/2005 |

OTHER PUBLICATIONS

Kilian et al. "Synthesis and Cleavage of Core-Labile Poly(Alkyl Methacrylate) Star Polymers", Wiley InterScience (www.interscience.wiley.com), Aug. 19, 2003, pp. 3083-3093.*

Kilian, L., et al., "Synthesis and Cleavage of Core-Labile Poly(Alkyl Methacrylate) Star Polymers," J. Polymer Science, Part A, 41, 3083-3093, (2003).

Japanese Patent Office, International Search Report and Written Opinion dated May 23, 2006, from related International Patent Application No. PCT/JP2006/306487, filed Sep. 5, 2006 (in Japanese).

Search Report, European Patent Application No. EP 06 76 6659, dated May 3, 2010.

* cited by examiner

*Primary Examiner*—Michael M Bernshteyn
(74) *Attorney, Agent, or Firm*—Kenyon & Kenyon LLP

(57) ABSTRACT

Disclosed are an acrylic acid-based polymer which is a star polymer containing a repeating unit derived from an (α-lower alkyl)acrylic ester represented by formula (I):

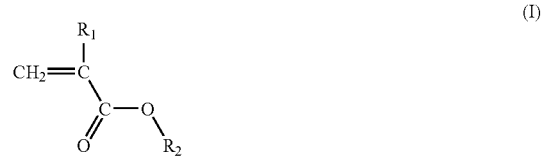

(wherein $R_1$ represents a hydrogen atom or a lower alkyl group, and $R_2$ represents an organic group having a polar group) in an arm portion; an acrylic acid-based polymer containing a repeating unit derived from an poly(α-lower alkyl) acrylic ester and a repeating unit derived from an (α-lower alkyl)acrylic ester represented by formula (I), and a method for producing a polymer through living polymerization, comprising forming an oligomer having a polymerization active end, which is an oligomer higher than an average 1.0-mer and lower than an average 4.0-mer or an average 4.0-mer, and polymerizing using the oligomer having a polymerization active end as an initiating species.

7 Claims, No Drawings

ACRYLIC ACID-BASED POLYMER AND METHOD OF PRODUCING THE SAME

TECHNICAL FIELD

The present invention relates to a novel acrylic acid-based copolymer which is useful as a material of a resist, and a method of producing the same.

Priority is claimed on Japanese Patent Application No. 2005-175804, filed Jun. 15, 2005, Japanese Patent Application No. 2005-175808, filed Jun. 15, 2005 and Japanese Patent Application No. 2005-175810, filed Jun. 15, 2005, the contents of which are incorporated herein by reference.

BACKGROUND ART

As a photosensitive material for an ArF resist, for example, a radiation sensitive material comprising a resin (A) having at least one polar group-containing alicyclic functional group, and a substance (B) having at least one functional group capable of generating an alkali-soluble group through an acid in a molecule is known. A copolymer of a mono- or trihydroxyadamantyl methacrylate and t-butyl methacrylate is listed as the resin (A) and the resin is a resin which has transparency to an excimer laser and is excellent in developing properties and dry etching resistance (see Patent Document 1).

Also, it is known that an acrylic acid-based polymer having a low molecular weight and narrow molecular weight distribution is useful as a photosensitive material for an ArF resist (see Patent Document 2)

Patent Document 1: Japanese Unexamined Patent Application, First Publication No. Hei 11-109632
Patent Document 2: Japanese Unexamined Patent Application, First Publication No. 2003-82010

DISCLOSURE OF THE INVENTION

However, a conventional photosensitive material does not necessarily enough performance for formation of a pattern of minute dimensions.

An object of the present invention is to provide an acrylic acid-based polymer which is useful for application such as a resist photosensitive material having performance which enables formation of a pattern of minute dimensions.

The present inventors have intensively studied so as to achieve the above object and found that the above object can be achieved by using a polymer containing a repeating unit derived from an (α-lower alkyl)acrylic ester having a specific functional group as an arm portion of a star polymer or controlling to a low molecular weight, and thus the present invention has been completed That is, the present invention includes the following.

(1) An acrylic acid-based polymer which is a star polymer containing a repeating unit derived from an (α-lower alkyl) acrylic ester represented by formula (I):

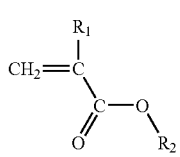

(wherein $R_1$ represents a hydrogen atom or a lower alkyl group, and $R_2$ represents an organic group having a polar group) in an arm portion.

(2) The acrylic acid-based polymer according to (1), wherein $R_2$ of formula (I) is an alicyclic functional group containing a polar group, or a lactone ring-containing functional group containing a polar group.

(3) The acrylic acid-based polymer according to (1) or (2), wherein the polar group in $R_2$ of formula (I) is a hydroxyl group, a protected hydroxyl group, a carboxyl group, or an ester group.

(4) The acrylic acid-based polymer according to any one of (1) to (3), wherein a core portion is a core formed by crosslinking a polyfunctional coupling agent.

(5) The acrylic acid-based polymer according to (4), wherein the polyfunctional coupling agent is a compound having at least two polymerizable double bonds per molecule.

(6) The acrylic acid-based polymer according to (4) or (5), wherein the polyfunctional coupling agent is a poly(α-lower alkyl)acrylate.

(7) The acrylic acid-based polymer according to any one of (1) to (6), wherein the polymer constituting the arm portion has a number average molecular weight of 5,000 or less.

(8) The acrylic acid-based polymer according to any one of (1) to (6), wherein the polymer constituting the arm portion has a number average molecular weight of 4,000 or less.

(9) An acrylic acid-based polymer containing a repeating unit derived from a poly(α-lower alkyl)acrylate, and a repeating unit derived from an (α-lower alkyl)acrylic ester represented by formula (I):

(wherein $R_1$ represents a hydrogen atom or a lower alkyl group, and $R_2$ represents an organic group having a polar group).

(10) The acrylic acid-based polymer according to any one of (1) to (9), wherein a ratio of a weight average molecular weight (Mw) to a number average molecular weight (Mn), (Mw/Mn), is from 1.01 to 1.50.

(11) An acrylic acid-based polymer which contains a repeating unit derived from an (α-lower alkyl)acrylic ester represented by formula (II):

(wherein $R_3$ represents a hydrogen atom or a lower alkyl group, $R_4$ represents an alicyclic skeleton-containing functional group, or a lactone ring-containing functional group) and has a number average molecular weight (Mn) of 4,000 or less.

(12) The acrylic acid-based polymer according to (11), wherein $R_4$ in formula (II) is an alicyclic skeleton-containing functional group containing a polar group, or a lactone ring-containing functional group containing a polar group.

(13) The acrylic acid-based polymer according to (11) or (12), which is a copolymer containing a repeating unit derived from an (α-lower alkyl)acrylic ester other than a repeating unit derived from an (α-lower alkyl)acrylic ester represented by formula (II).

(14) An acrylic acid-based polymer which contains a repeating unit derived from an (α-lower alkyl)acrylic ester represented by formula (II-1):

(wherein $R_3$, represents a hydrogen atom or a lower alkyl group, and $R_{41}$ represents an alicyclic skeleton-containing functional group containing a hydroxyl group and/or a carboxyl group, or a lactone ring-containing functional group containing a hydroxyl group and/or a carboxyl group) and has a number average molecular weight (Mn) of 5,000 or less.

(15) The acrylic acid-based polymer according to any one of (10) to (14), wherein a ratio of a weight average molecular weight (Mw) to a number average molecular weight (Mn), (Mw/Mn), is from 1.01 to 1.30.

(16) A method for producing a polymer through living polymerization, including forming an oligomer having a polymerization active end, which is an oligomer higher than an average 1.0-mer and lower than an average 4.0-mer or an average 4.0-mer, and polymerizing using the oligomer having a polymerization active end as an initiating species.

(17) The method for producing a polymer according to (16), wherein the monomer is allowed to disappear in the stage of formation of the oligomer having a polymerization active end.

(18) The method for producing a polymer according to (16) or (17), wherein the monomer is added in at least two portions to form the oligomer having a polymerization active end.

(19) The method for producing a polymer according to any one of (16) to (18), wherein the living polymerization is anionic polymerization.

(20) The method for producing a polymer according to any one of (16) to (19), wherein formation of the oligomer having a polymerization active end and/or polymerization are conducted under a condition of −20° C. or lower.

The acrylic acid-based polymer of the present invention has narrow molecular weight distribution and is excellent in acid degradability, and is also extremely excellent in solubility in a solvent, and is therefore useful for a resist material. According to the method of the present invention, a polymer having narrow molecular weight distribution can be produced easily and surely, and its industrial utility value is great.

BEST MODE FOR CARRYING OUT THE INVENTION

The acrylic acid-based polymer of the present invention is a star polymer in which a repeating unit derived from an (α-lower alkyl)acrylic ester represented by formula (I) is used as an arm portion. (α-lower alkyl)acrylic ester means an acrylic ester and an α-lower alkyl acrylic ester, and (α-lower alkyl)acrylate means an acrylate and an α-lower alkyl acrylate. Hereinafter, the (α-lower alkyl)acrylic ester is referred to as an acrylic ester and the (α-lower alkyl)acrylate is referred to as an acrylate.

In formula (I), $R_1$ represents a hydrogen atom or a lower alkyl group, and $R_2$ represents an organic group having a polar group. Lower alkyl group refers to a C1-C5 alkyl group and specific examples include a methyl group, an ethyl group, an n-propyl group, and an isopropyl group, of which a methyl group is preferred. In the following description, the lower alkyl group is as defined above. Organic group is a generic name of a functional group containing at least one carbon atom and is preferably a functional group of 5 or more C, and is more preferably a C6-C20 functional group. Particularly, a functional group having an alicyclic skeleton (alicyclic functional group) and a functional group having a lactone ring skeleton (lactone ring-containing functional group) are preferred.

Specific examples of the polar group include a hydroxyl group, an alkoxy group, an aryloxy group, a carboxyl group, an ester group, an acyl group, a benzoyl group, a sulfonyl group, a sulfinyl group, a sulfenyl group, a nonsubstituted or substituted amino group, a carbamoyl group, and a sulfamoyl group, of which a hydroxyl group, a protected hydroxyl group, a carboxyl group, and an ester group are particularly preferred. Protected hydroxyl group means a functional group in which active hydrogen is modified with a functional group which can be used as a protective group of a hydroxyl group. Specific examples include alkoxy groups such as a methoxy group, an ethoxy group, a methoxymethoxy group, a 1-methoxyethoxy group, a 1-ethoxyethoxy group, a 1-methoxypropoxy group, a 1-methyl-1-methoxyethoxy group, a 1-(isopropoxy)ethoxy group, a 2-methoxyethoxymethoxy group, a bis(2-chloroethoxy)methoxy group, a 2-tetrahydropyranyl group, a 4-methoxy-2-tetrahydropyranyl group, a 2-tetrahydrofuranyl group, a triphenylmethoxy group, a 2-(trimethylsilyl)ethoxymethoxy group, and a trimethylsilylmethoxy group; aryloxy groups such as a phenoxy group, a benzyloxy group, and a naphthyloxy group; acyloxy groups such as an acetoxy group and a benzoyloxy group; sulfonyloxy groups such as a mesyloxy group and a tosyloxy group; dialkylcarbamoyloxy groups such as a dimethylcarbamoyloxy group; and silyloxy groups such as a trimethylsilyloxy group and a t-butyldimethylsilyloxy group.

Specific examples of the ester group include a methoxycarbonyl group, an ethoxycarbonyl group, a phenoxy carbonyl group, a t-butoxycarbonyl group, and a 1-ethoxyethoxycarbonyl group.

There are no particular restrictions on the number of the polar groups and two or more polar groups may be included, and also there are no particular restrictions on the position thereof. Solubility in the solvent and stability are improved by inclusion of the polar group.

Specific examples of the alicyclic functional group include organic groups represented by formula (III) shown below. At this time, A shown below may contain the polar group as a substituent, but B shown below preferably contains the polar group. Typical examples of the polar group include, but are not limited to, a hydroxyl group and a carboxyl group.

-A-B  (III)

In the formula, A represents a single bond, an ether group, an ester group, a carbonyl group, an alkylene group, or a divalent group of a combination of these groups, and specific examples include divalent groups represented by formulas shown below.

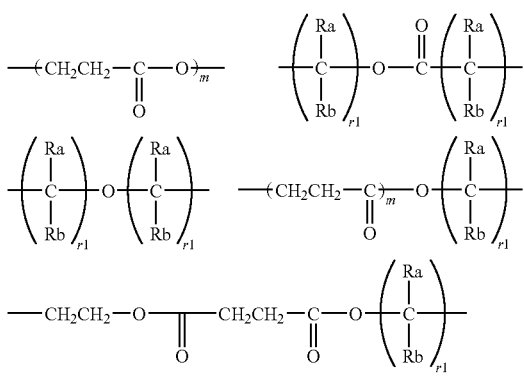

In the formulas shown above, Ra and Rb each represents, independently, a hydrogen atom, an alkyl group which may contain a substituent, a halogen atom, a hydroxyl group, or an alkoxy group. Specifically, lower alkyl groups such as a methyl group, an ethyl group, an n-propyl group, an isopropyl group, and an n-butyl group are preferred. Examples of the substituent of the substituted alkyl group include a hydroxyl group, a carboxyl group, a halogen atom, and an alkoxy group, and examples of the alkoxy group include C1-C4 alkoxy groups such as a methoxy group, an ethoxy group, a propoxy group, and a butoxy group. Examples of the halogen atom include a chlorine atom, a bromine atom, a fluorine atom, and an iodine atom. r1 represents an integer from 1 to 10, and m represents any integer from 1 to 3.

In formula, B represents any of formulas (IV-1) to (IV-6).

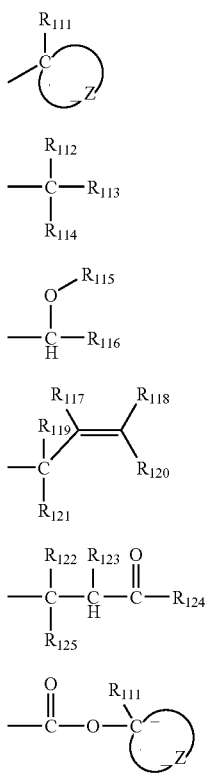

In formulas (IV-1) and (IV-6) shown above, $R_{111}$ represents a hydroxyl group, a carboxyl group, or a C1-C5 alkyl group which may contain a hydroxyl group and/or a carboxyl group as a substituent, and Z represents an atomic group required to form an alicyclic hydrocarbon group with a carbon atom and may contain a hydroxyl group and/or a carboxyl group as the substituent. When $R_{111}$ is a C1-C5 alkyl group, it may contain a straight-chain or a branched-chain. In the following description, the alkyl group is as defined above.

In formulas (IV-2) and (IV-3) shown above, $R_{112}$ to $R_{116}$ represent a hydroxyl group, a carboxyl group, a C1-C4 alkyl group which may contain a hydroxyl group and/or a carboxyl group as the substituent, or an alicyclic hydrocarbon group which may contain a hydroxyl group and/or a carboxyl group as the substituent. At least one of $R_{112}$ to $R_{114}$, or either $R_{115}$ or $R_{116}$ represents an alicyclic hydrocarbon group which may contain a hydroxyl group and/or a carboxyl group as the substituent.

In formula (IV-4) shown above, $R_{117}$ to $R_{121}$ each represents, independently, a hydroxyl group, a carboxyl group, a hydrogen atom, a C1-C4 alkyl group which may contain a hydroxyl group and/or a carboxyl group as the substituent, or an alicyclic hydrocarbon group which may contain a hydroxyl group and/or a carboxyl group as the substituent. At least one of $R_{117}$ to $R_{121}$, represents an alicyclic hydrocarbon group may contain a hydroxyl group and/or a carboxyl group as the substituent, and either $R_{119}$ or $R_{121}$ represents a C1-C4 alkyl group which may contain a hydroxyl group and/or a carboxyl group as the substituent, or an alicyclic hydrocarbon group which may contain a hydroxyl group and/or a carboxyl group as the substituent.

In formula (IV-5) shown above, $R_{122}$ to $R_{125}$ each represents, independently, a hydroxyl group, a carboxyl group, a hydrogen atom, a C1-C4 alkyl group which may contain a hydroxyl group and/or a carboxyl group as the substituent, or an alicyclic hydrocarbon group which may contain a hydroxyl group and/or a carboxyl group as the substituent. At least one of $R_{122}$ to $R_{125}$ represents an alicyclic hydrocarbon group which may contain a hydroxyl group and/or a carboxyl group as the substituent.

Specific examples of the alicyclic hydrocarbon group which may contain a hydroxyl group and/or a carboxyl group as the substituent include skeletons represented by the formulas shown below. In the present invention, such an alicyclic hydrocarbon group preferably contains a hydroxyl group and/or a carboxyl group, and there are no particular restrictions on the substitution position and the number of the groups.

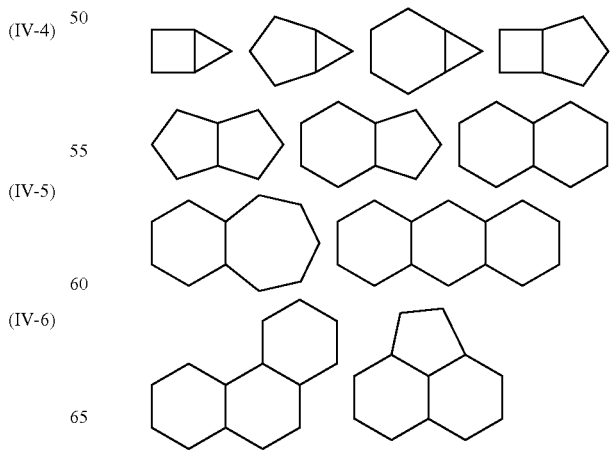

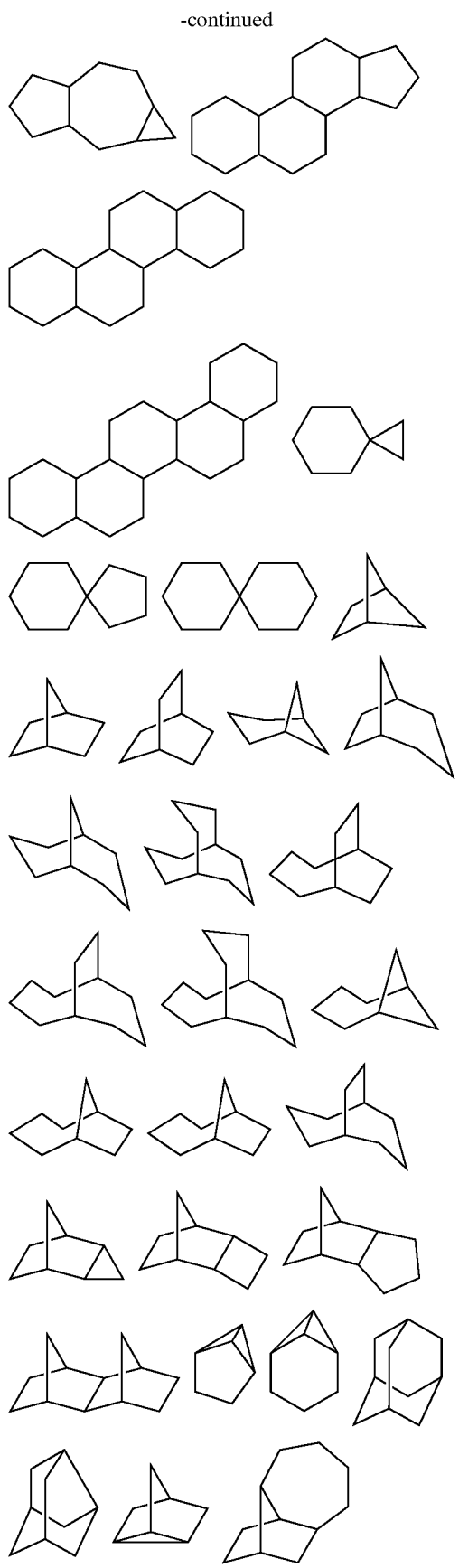

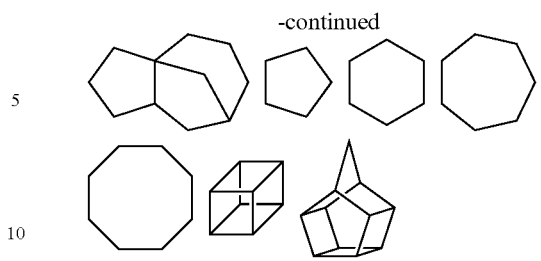

Specific examples of $R_2$ include organic groups shown below. While the t-butoxycarbonyl group was used as a typical example of the polar group, the polar group is not limited thereto.

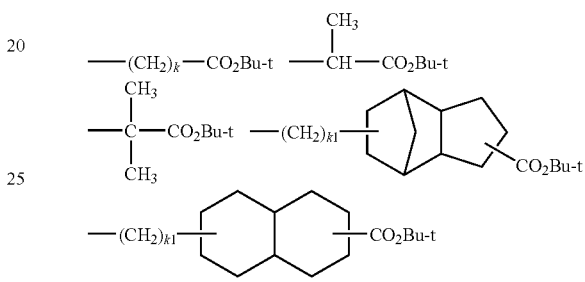

(k is an integer of 1 or more, and k1 is 0 or an integer of 1 or more)

Of these groups, an adamantyl group containing a hydroxyl group and/or a carboxyl group as the substituent is preferred and adamantyl groups represented by formulas (V-1) to (V-3) shown below are preferred. Particularly, an adamantyl group represented by (V-3), and an adamantyl group whose active hydrogen is protected with a proper functional group are preferred.

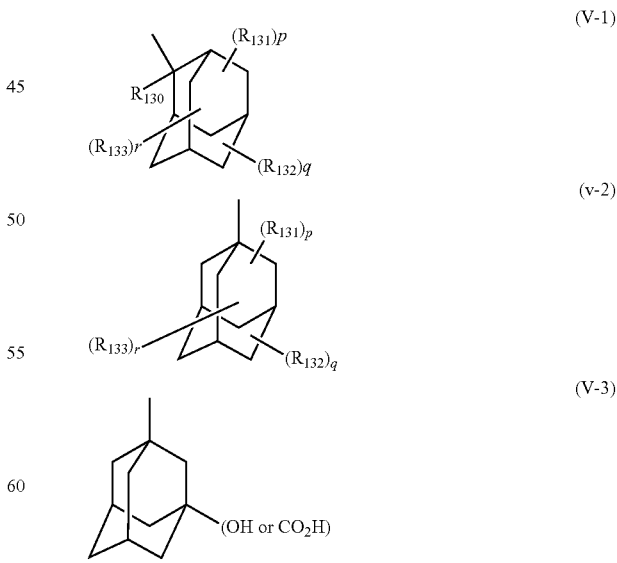

In formula (V-1) and formula (V-2), $R_{130}$ represents an alkyl group which may contain a substituent, $R_{131}$ and $R_{132}$ each represents, independently, a hydroxyl group, a halogen atom, a carboxyl group, an alkyl group, a cycloalkyl group, an alkenyl group, an alkoxy group, an alkoxycarbonyl group, or an acyl group, and at least one of $R_{131}$ and $R_{132}$ is a hydroxyl group or a carboxyl group. p, q and r each represents, independently, 0 or any integer from 1 to 3, and at least one of them is 1 or more. When p, q or r is 2 or more, $R_{131}$ may be the same or different, $R_{132}$ may be the same or different and $R_{133}$ may be the same or different.

Specific examples of the acrylic ester represented by formula (I) containing an alicyclic functional group having a polar group include those in which one or more polar groups as the substituent are substituted at any position of an alicyclic hydrocarbon group in the compound represented by the formulas shown below. $R_{10}$ and $R_{10'}$ each independently represents a straight-chain or branched-chain lower alkyl group.

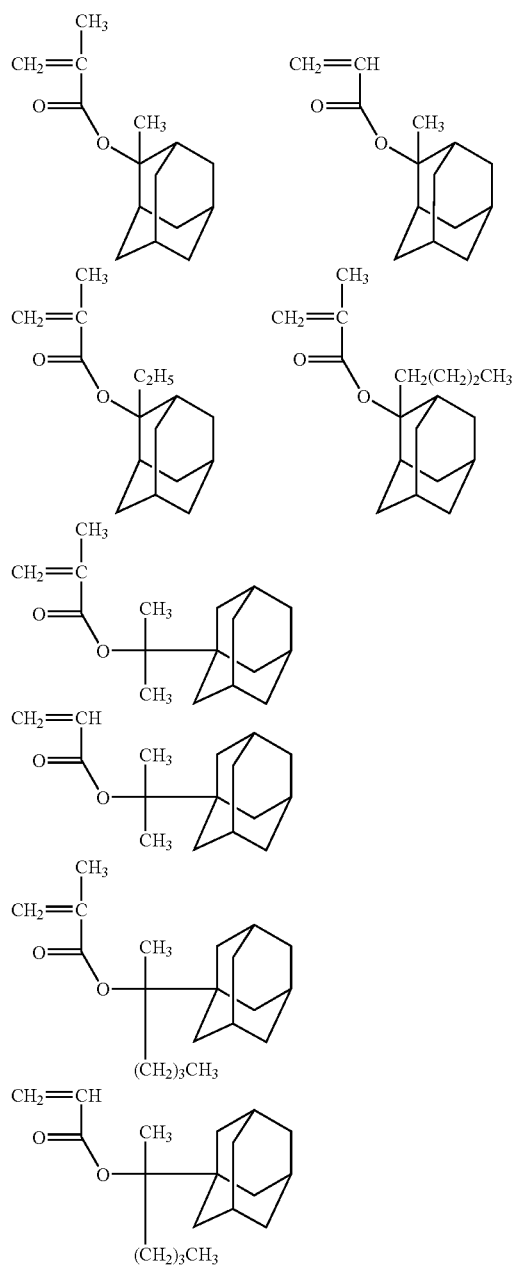

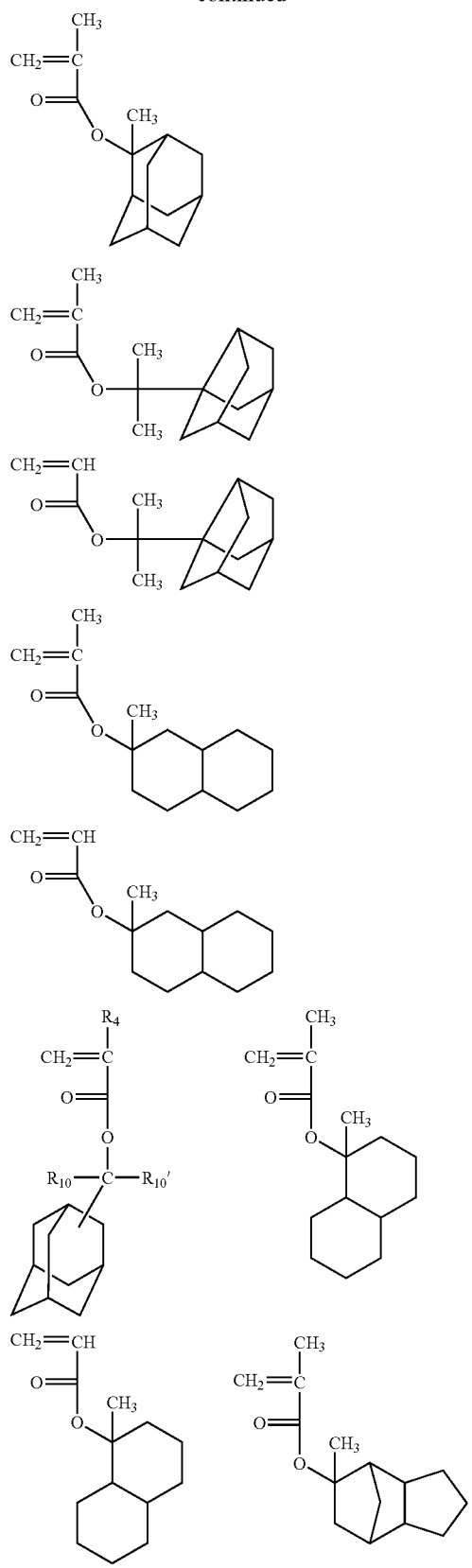

-continued
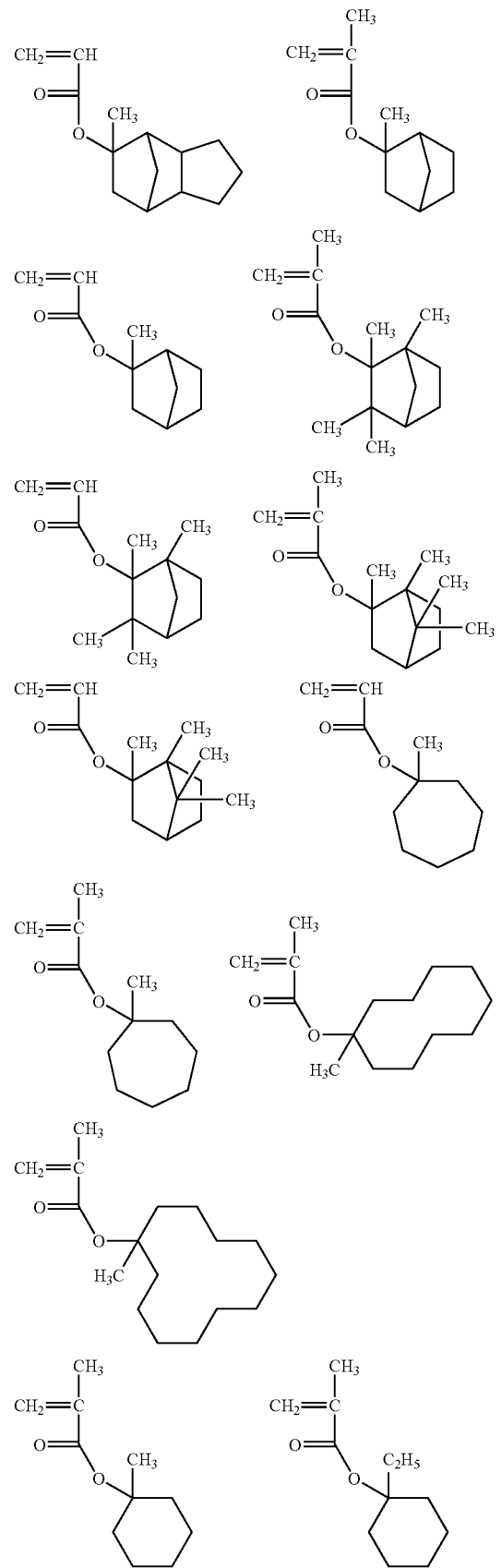
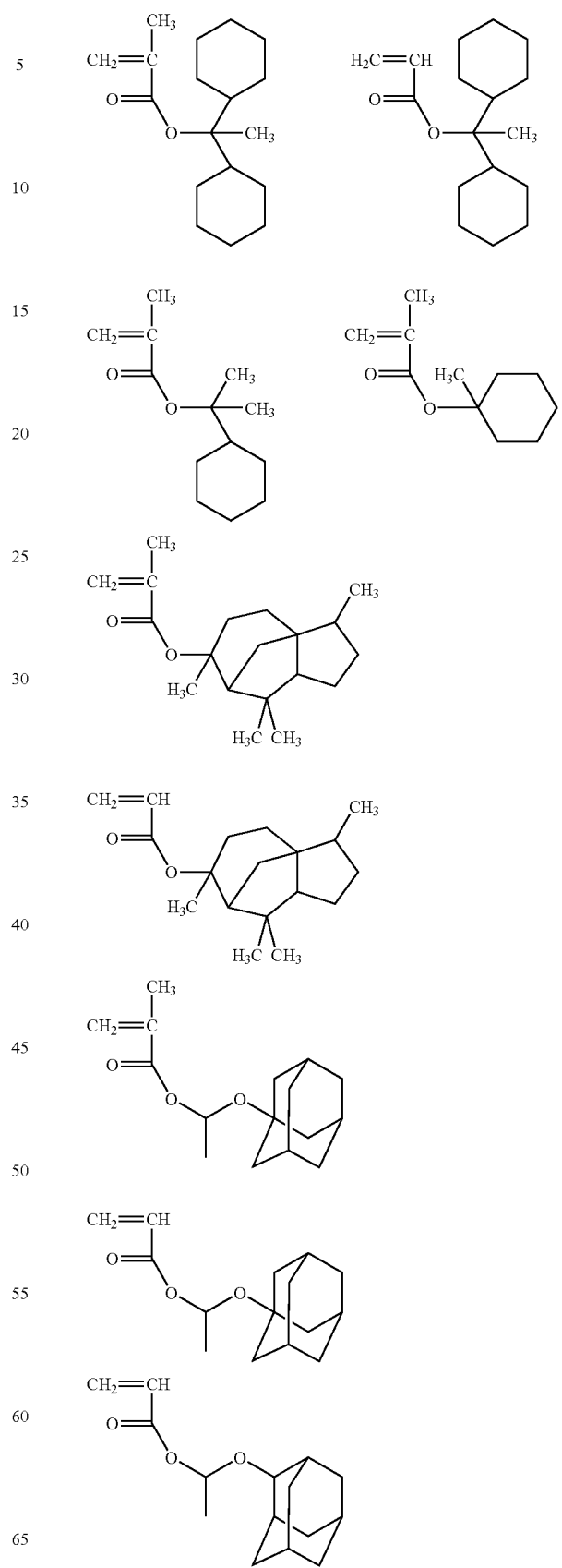

-continued

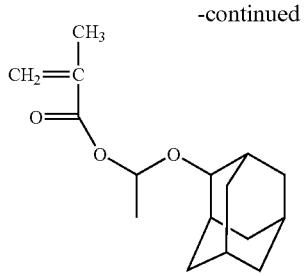

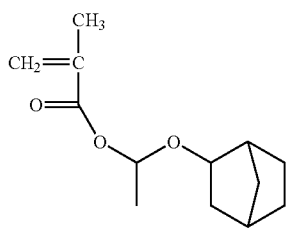

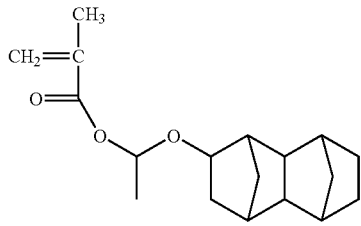

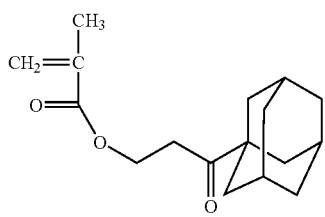

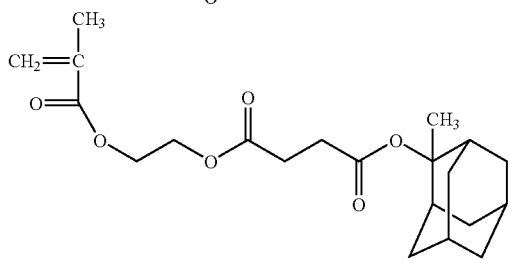

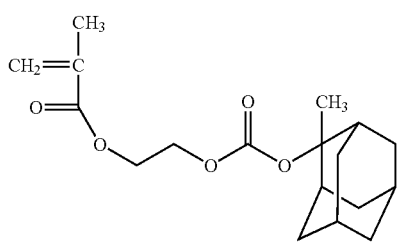

Specific examples of the acrylic ester represented by formula (I), which contains an organic group having a lactone ring, include butyrolactone acrylate, butyrolactone methacrylate, mevalonic lactone methacrylate, and pantolactone methacrylate, of which an organic group represented by formula (VI) shown below is preferred. At this time, A shown below may contain the polar group as a substituent, but C shown below preferably contains the polar group. Typical examples of the polar group include, but are not limited to, a hydroxyl group and a carboxyl group.

$$-A-C \quad (VI)$$

In the formula, A is as defined for the divalent group shown above and C represents any of formulas (VI-1) to (VI-5) shown below.

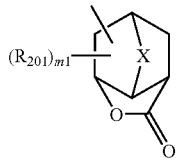
(VI-1)

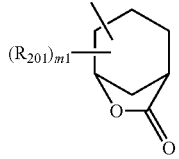
(VI-2)

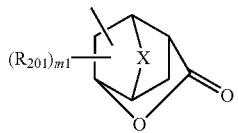
(VI-3)

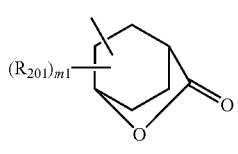
(VI-4)

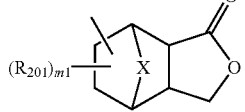
(VI-5)

In formulas (VI-1) to (VI-5), X represents an oxygen atom, a sulfur atom, or an alkylene group which may contain a substituent, $R_{201}$ represents an alkyl group which may contain a hydroxyl group and/or a carboxyl group as the substituent, a cycloalkyl group which may contain a hydroxyl group and/or a carboxyl group as the substituent, an alkenyl group which may contain a hydroxyl group and/or a carboxyl group as the substituent, a hydroxyl group, or a carboxyl group, m1 represents any integer of 0 or 1 to 5, and m1 is preferably 1 or more and $R_{201}$ preferably contains a hydroxyl group and/or a carboxyl group. When m1 is 2 or more, $R_{201}$ may be the same or different, or may be combined with each other to form a ring.

Specific examples of the acrylic ester represented by formula (I) in which an organic group has a lactone ring include those in which one or more hydroxyl groups and/or carboxyl groups as the substituent are substituted at any position of a lactone ring in the compound represented by the formulas shown below.

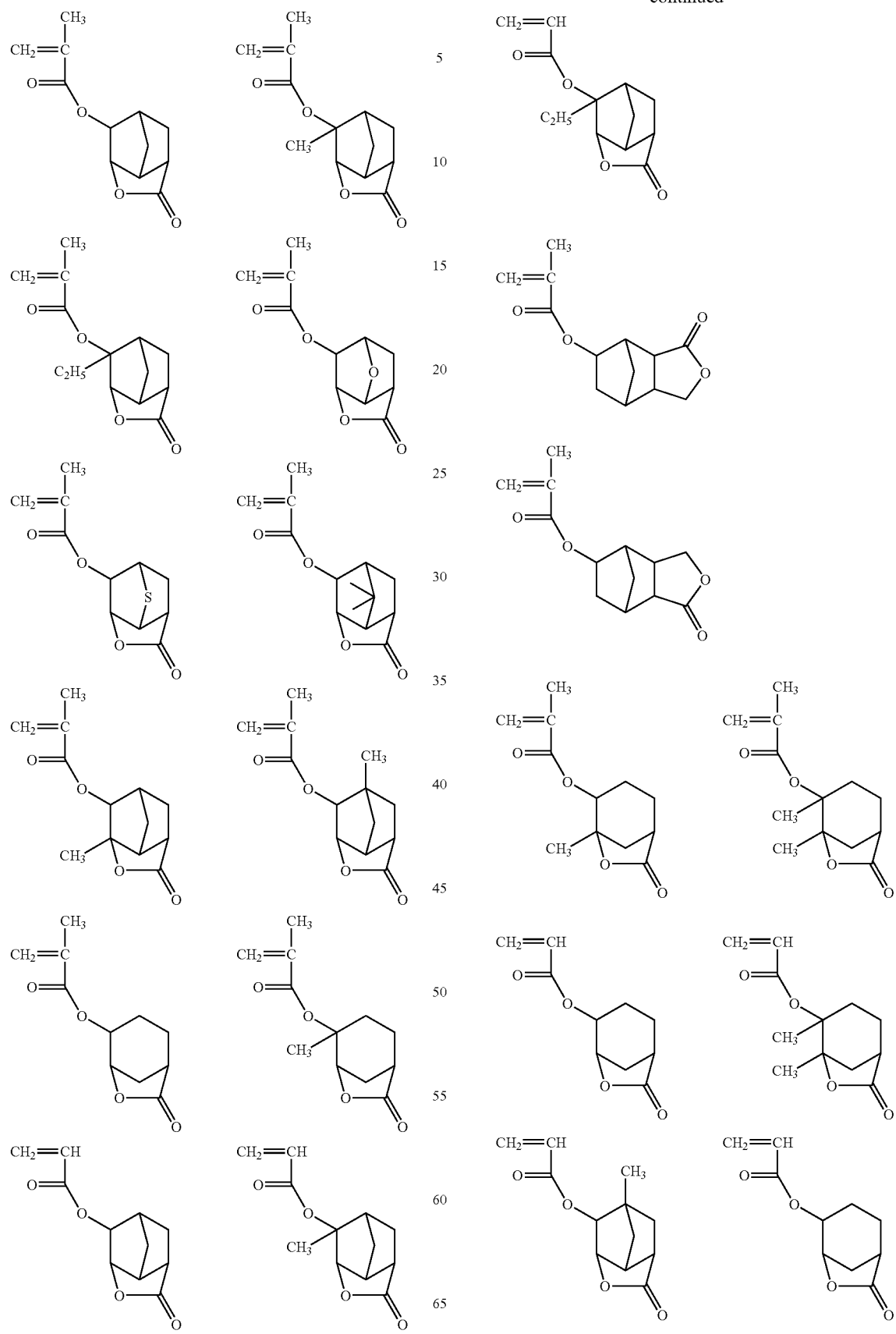

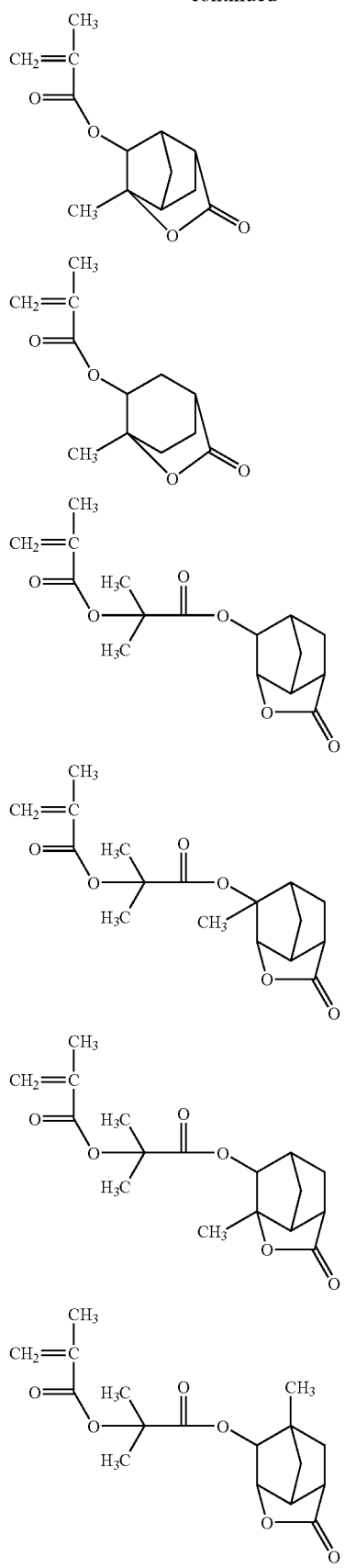
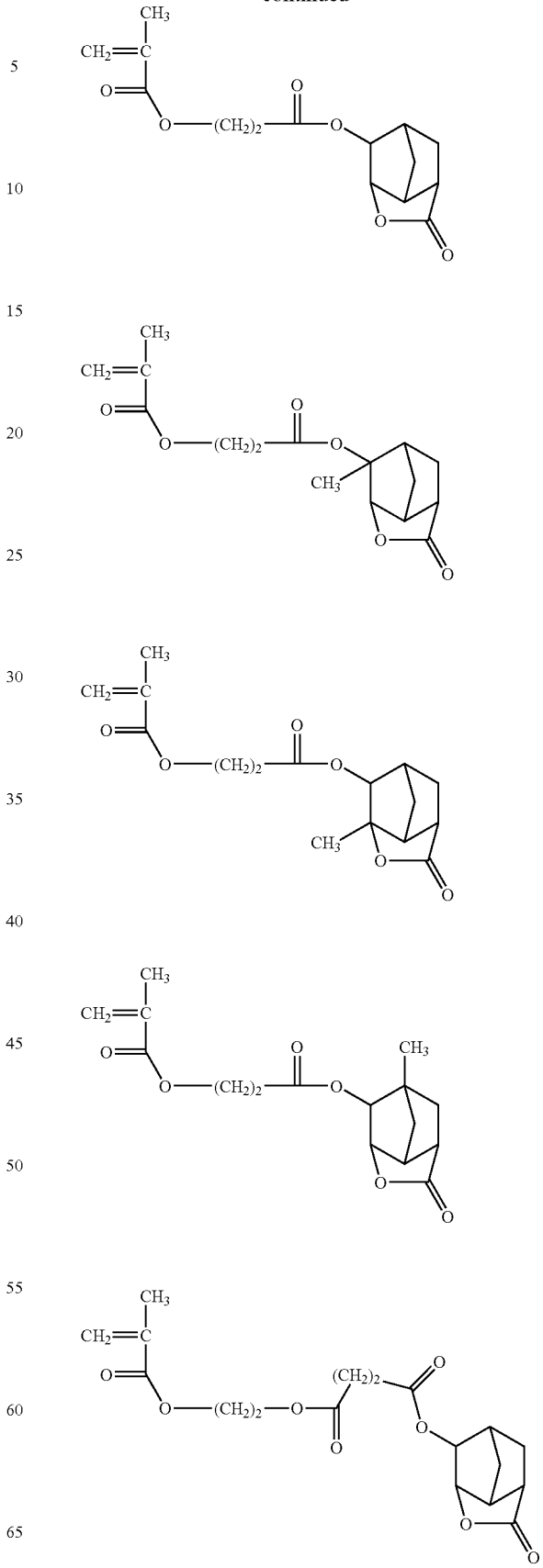

-continued
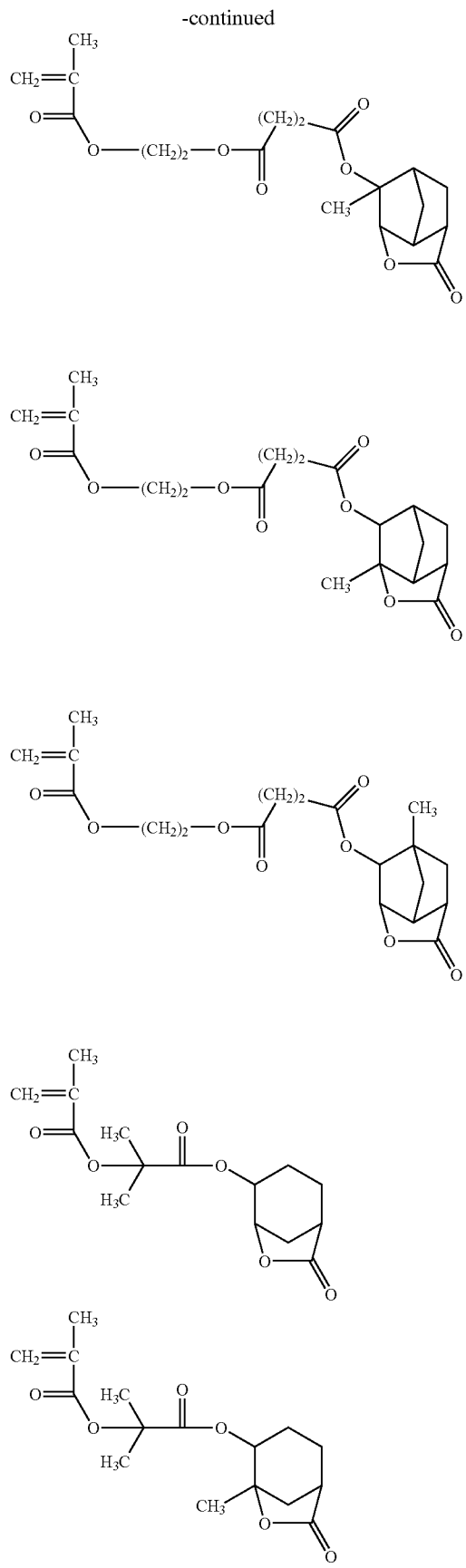
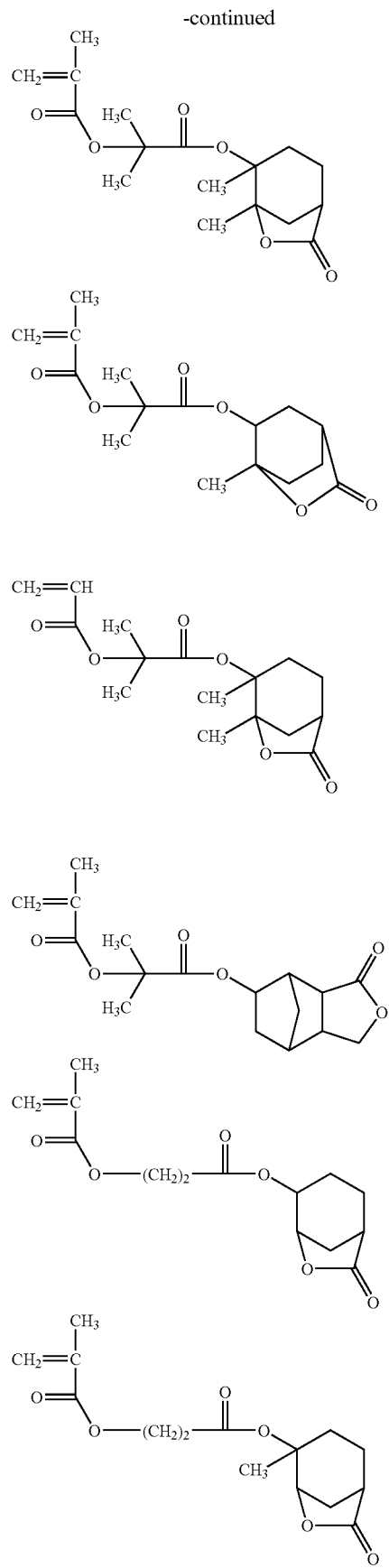

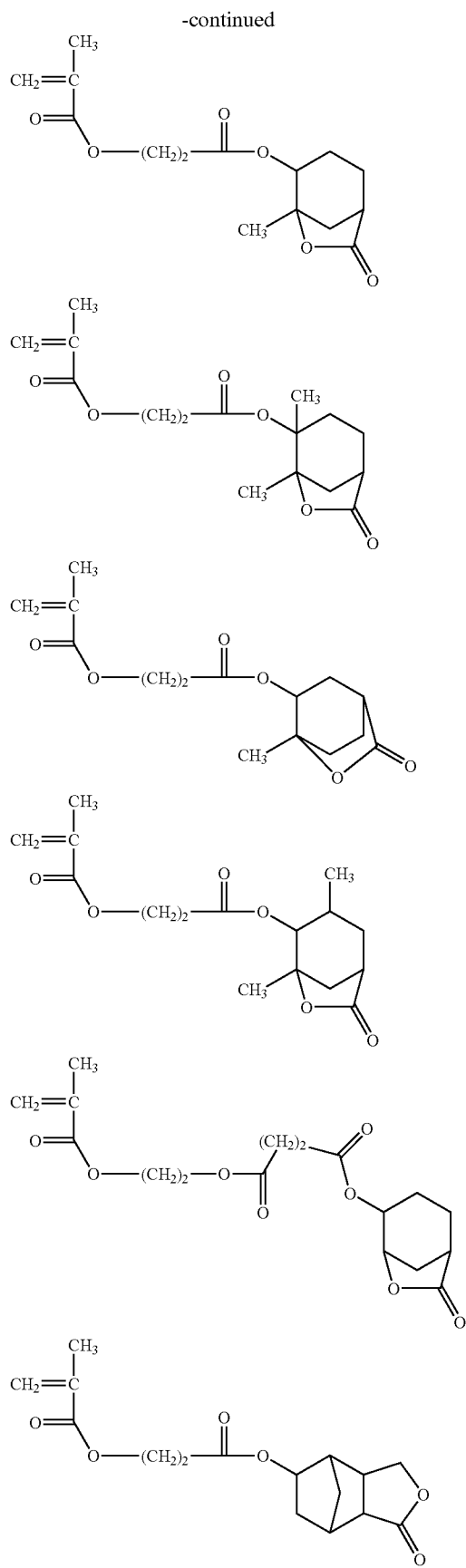
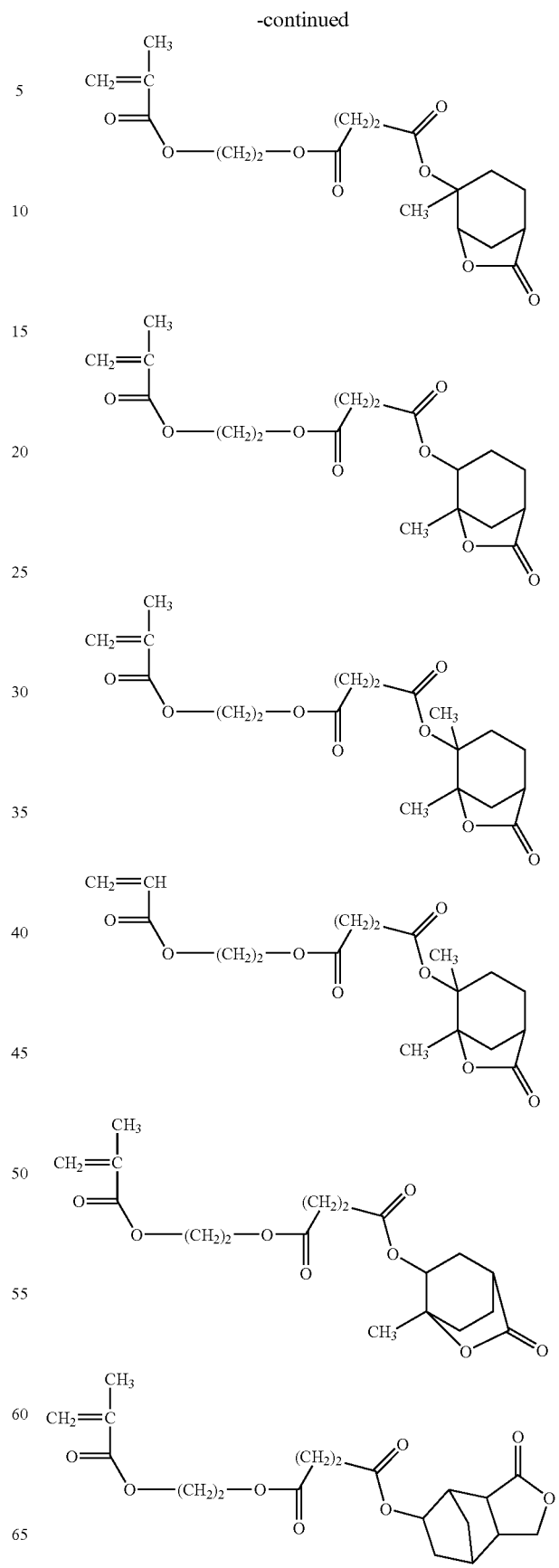

-continued

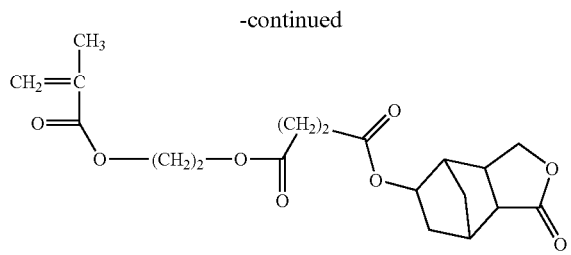

The acrylic acid-based polymer of the present invention can contain a repeating unit other than a repeating unit derived from an acrylic ester represented by formula (I) in the arm portion.

Furthermore, the acrylic acid-based copolymer of the present invention may contain one or more kinds of repeating units derived from an acrylic ester represented by formula (I) in which $R_1$ and $R_2$ do not contain a polar group. Specific examples of the acrylic ester include acrylic esters such as methyl acrylate, ethyl acrylate, propyl acrylate, t-butyl acrylate, amyl acrylate, cyclohexyl acrylate, ethylhexyl acrylate, octyl acrylate, t-octyl acrylate, chloroethyl acrylate, 2-ethoxyethyl acrylate, 2,2-dimethyl-3-ethoxypropyl acrylate, 5-ethoxypentyl acrylate, 1-methoxyethyl acrylate, 1-ethoxyethyl acrylate, 1-methoxypropyl acrylate, 1-methyl-1-methoxyethyl acrylate, 1-(isopropoxy)ethyl acrylate, benzyl acrylate, methoxybenzyl acrylate, furfuryl acrylate, and tetrahydrofurfuryl acrylate; methacrylic esters such as methyl methacrylate, ethyl methacrylate, propyl methacrylate, isopropyl methacrylate, amyl methacrylate, t-butyl methacrylate, hexyl methacrylate, cyclohexyl methacrylate, benzyl methacrylate, chlorobenzyl methacrylate, octyl methacrylate, 2-ethoxyethyl methacrylate, 4-methoxybutyl methacrylate, 5-methoxypentyl methacrylate, 2,2-dimethyl-3-ethoxypropyl methacrylate, 1-methoxyethyl methacrylate, 1-ethoxyethyl methacrylate, 1-methoxypropyl methacrylate, 1-methyl-1-methoxyethyl methacrylate, 1-(isopropoxy)ethyl methacrylate, furfuryl methacrylate, and tetrahydrofurfuryl methacrylate; crotonate esters such as methyl crotonate, ethyl crotonate, propyl crotonate, amyl crotonate, cyclohexyl crotonate, ethylhexyl crotonate, octyl crotonate, t-octyl crotonate, chloroethyl crotonate, 2-ethoxyethyl crotonate, 2,2-dimethyl-3-ethoxypropyl crotonate, 5-ethoxypentyl crotonate, 1-methoxyethyl crotonate, 1-ethoxyethyl crotonate, 1-methoxypropyl crotonate, 1-methyl-1-methoxyethyl crotonate, 1-(isopropoxy)ethyl crotonate, benzyl crotonate, methoxybenzyl crotonate, furfuryl crotonate, and tetrahydrofurfuryl crotonate; and itaconate esters such as dimethyl itaconate, diethyl itaconate, dipropyl itaconate, diamyl itaconate, dicyclohexyl itaconate, bis(ethylhexyl) itaconate, dioctyl itaconate, di-t-octyl itaconate, bis(chloroethyl)itaconate, bis(2-ethoxyethyl)itaconate, bis(2,2-dimethyl-3-ethoxypropyl) itaconate, bis(5-ethoxypentyl)itaconate, bis(1-methoxyethyl)itaconate, bis(1-ethoxyethyl)itaconate, bis(1-methoxypropyl)itaconate, bis(1-methyl-1-methoxyethyl) itaconate, bis(1-(isopropoxy)ethyl)itaconate, dibenzyl itaconate, bis(methoxybenzyl)itaconate, difurfuryl itaconate, and ditetrahydrofurfuryl itaconate. Particularly, acrylic esters, in which the substituent is an alkyl group having tetiary carbon in the α-position of the ester oxygen, such as t-butyl acrylate, t-butyl methacrylate, 1,1-dimethylpropyl acrylate, and 1,1-dimethyl methacrylate are preferred.

Furthermore, acrylic esters in which a polar group has been removed in the acrylic esters listed specifically in formula (I) can be included. When the ester group moiety is an organic group having an alicyclic hydrocarbon skeleton, the content of the repeating unit in the entire repeating unit is preferably from 10 to 80 mol %, more preferably from 20 to 70 mol %, still more preferably from 20 to 60%, further preferably from 20 to 55 mol %, and particularly preferably from 25 to 50 mol %. When the ester group moiety is an organic group having a lactone ring, the content of the repeating unit in the entire repeating unit is preferably from 0 to 60 mol %, more preferably from 10 to 50 mol %, and still more preferably from 20 to 50 mol %. The acrylic acid-based polymer of the present invention preferably contains repeating units derived from two or more kinds of acrylic esters described above, which are different from the acrylic ester represented by formula (I). One acrylic ester is preferably an acrylic ester in which the ester group moiety is an organic group having an alicyclic hydrocarbon skeleton, while the other acrylic ester is preferably an acrylic ester in which the ester group moiety is an organic group having a lactone ring. When the acrylic acid-based copolymer is used as a resist material, it is preferred to contain a repeating unit derived from an acrylic ester in which the ester group moiety is an acid decomposable/leaving group. Acid decomposable/leaving group means a group which is decomposed or left due to an action of an acid, and specific examples include an alicyclic hydrocarbon group such as a 1-adamantyl group, a 2-ethyl-2-adamantyl group, or a 1-ethyl-1-cyclohexyl group, and a t-butyl group. Also, an acrylic ester represented by formula (I) can include an acrylic ester having an acid decomposable/leaving group as a specific example.

In the arm portion, the content of each repeating unit can be optionally selected according to the content of the monomer used in the reaction. For example, the content of the repeating unit containing an alicyclic hydrocarbon skeleton in the entire repeating units of the arm portion is usually from 15 to 70 mol %, preferably from 25 to 65 mol %, and more preferably from 30 to 60 mol %. The content of the repeating unit containing a lactone ring in the entire repeating units of the arm portion is usually from 0 to 60 mol %, preferably from 10 to 60 mol %, and more preferably from preferably from 15 to 55 mol %. The content of the repeating unit containing neither an alicyclic hydrocarbon skeleton nor a lactone ring in the entire repeating units of the arm portion is usually from 0 mol % to 100 mol %, preferably from 2 to 70 mol %, and more preferably from 5 to 60 mol %.

Each repeating unit can be arranged without being limited to the polymerization mode such as random, block, graft, or dendritic polymerization, and an outermost shell (end of the arm portion) of the star polymer preferably contains a constituent unit containing an organic group having an alicyclic hydrocarbon skeleton. That is, the outermost shell of the star polymer preferably contains a constituent unit derived from an acrylic ester containing an organic group having an alicyclic hydrocarbon skeleton.

The polystyrene equivalent number average molecular weight Mn determined using gel permeation chromatography of the arm portion is preferably from 1,000 to 30,000, more preferably from 1,500 to 10,000, and still more preferably from 2,000 to 6,000. Taking account of application to a resist material, the number average molecular weight is preferably 5,000 or less, more preferably 4,000 or less, still more preferably 3,500 or less, and particularly preferably from 100 to 3,300. The ratio of the weight average molecular weight (Mw) to the number average molecular weight (Mn), (Mw/Mn), is preferably within a range from 1.01 to 3.00, more preferably from 1.01 to 2.00, still more preferably from 1.01 to 1.30, further preferably from 1.01 to 1.20, and particularly preferably from 1.01 to 1.15.

The polymer of the above arm portion can be used not only as parts of the star polymer of the present invention, but also as the polymer as is in the resist material.

In formula (II), $R_3$ represents a hydrogen atom or a lower alkyl and specific examples include the same as those of $R_1$ in formula (I). $R_4$ represents an alicyclic skeleton-containing functional group, or a lactone ring-containing functional group, and specific examples include the same groups as those of $R_2$ in formula (I), groups in which a polar group has been removed from specific examples in $R_2$, groups having another substituent in a proper position regardless of the presence or absence of the polar group in specific examples in $R_2$, and groups having an alicyclic skeleton or a lactone ring skeleton.

The number average molecular weight is preferably 4,000 or less, more preferably 3,500 or less, and particularly preferably from 100 to 3,300. The ratio of the weight average molecular weight (Mw) to the number average molecular weight (Mn), (Mw/Mn), is preferably within a range from 1.01 to 3.00, preferably from 1.01 to 2.00, still more preferably from 1.01 to 1.30, further preferably from 1.01 to 1.20, and particularly preferably from 1.01 to 1.15.

In formula (II-1), $R_{31}$ is as defined for $R_3$, $R_{41}$ represents an alicyclic skeleton-containing functional group or a lactone ring-containing functional group, each containing a hydroxyl group and/or a carboxyl group, and specific examples include groups in which a polar group of $R_2$ in formula (I) is a hydroxyl group and/or a carboxyl group, groups having an alicyclic skeleton or a lactone ring skeleton. The number average molecular weight is preferably 5,000 or less, more preferably 4,000 or less, still more preferably 3,500 or less, and particularly preferably from 100 to 3,300. The ratio of the weight average molecular weight (Mw) to the number average molecular weight (Mn), (Mw/Mn), is preferably within a range from 1.01 to 3.00, more preferably from 1.01 to 2.00, still more preferably from 1.01 to 1.30, further preferably from 1.01 to 1.20, and particularly preferably from 1.01 to 1.15.

The core portion of the acrylic acid-based polymer of the present invention is preferably a polyfunctional coupling agent, for example, a tri- or polyfunctional compound. When the tri- or polyfunctional compound can be formed by reaction even in the case of a trifunctional compound, it can be used. A core portion having a structure formed by polymerization and crosslinking of a polyfunctional coupling agent is preferred.

The polyfunctional coupling agent includes known compounds and a polyacrylate (which means a poly(α-lower alkyl)acrylate) is preferred.

There are no particular restrictions on the polyacrylate so long as it is a compound containing two or more acrylic ester moieties in a molecule. Specific examples include ethylene glycol diacrylate, propylene glycol diacrylate, glycerin triacrylate, and cyclohexane-1,4-dioldiacrylate, of which a polyacrylate having a partial structure represented by formula (VII) shown below is preferred.

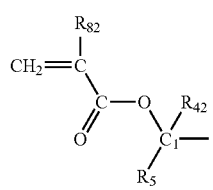

(VII)

In the formula, $R_{32}$ represents a hydrogen atom or a lower alkyl group, and $R_{42}$ and $R_5$ each represents, independently, an organic group which is bonded with a carbon atom.

In this case, the organic group represents a generic name of a functional group containing at least one carbon atom, and organic group which is bonded with a carbon atom means that an element at the α-position of $C_1$ carbon in the organic group is a carbon atom. Specific examples include a methyl group, an ethyl group, an n-propyl group, an isopropyl group, an n-butyl group, a t-butyl group, a cyclopropyl group, a cyclohexyl group, a benzyl group, a phenethyl group, a phenyl group, a 1-naphthyl group, a vinyl group, an allyl group, an ethynyl group, a propargyl group, a chloromethyl group, a 2-chloroethyl group, a 1-chloroethyl group, a 2-pyridyl group, and a 2-pyridylmethyl group.

The carbon $C_1$ is bonded with an oxygen atom, and $R_{42}$ and $R_5$, and has another bond, and a carbon atom is bonded with the carbon $C_1$. That is, it means that the carbon $C_1$ is not bonded with atoms other than a carbon atom, for example, an oxygen atom and a sulfur atom. There are no particular restrictions on the other moiety containing a carbon atom at the end so long as it is a structure containing at least one partial structure having an acrylic ester structure. Specific examples include the structures shown below. A partial structure represented by formula (VII) and an acrylic ester partial structure are omitted. Partial structures represented by two or more formulas (VII) may be the same or different.

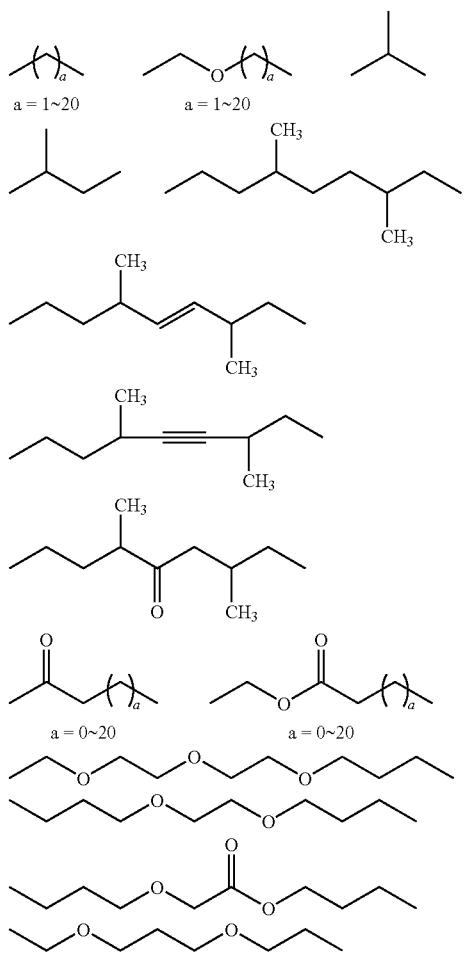

-continued
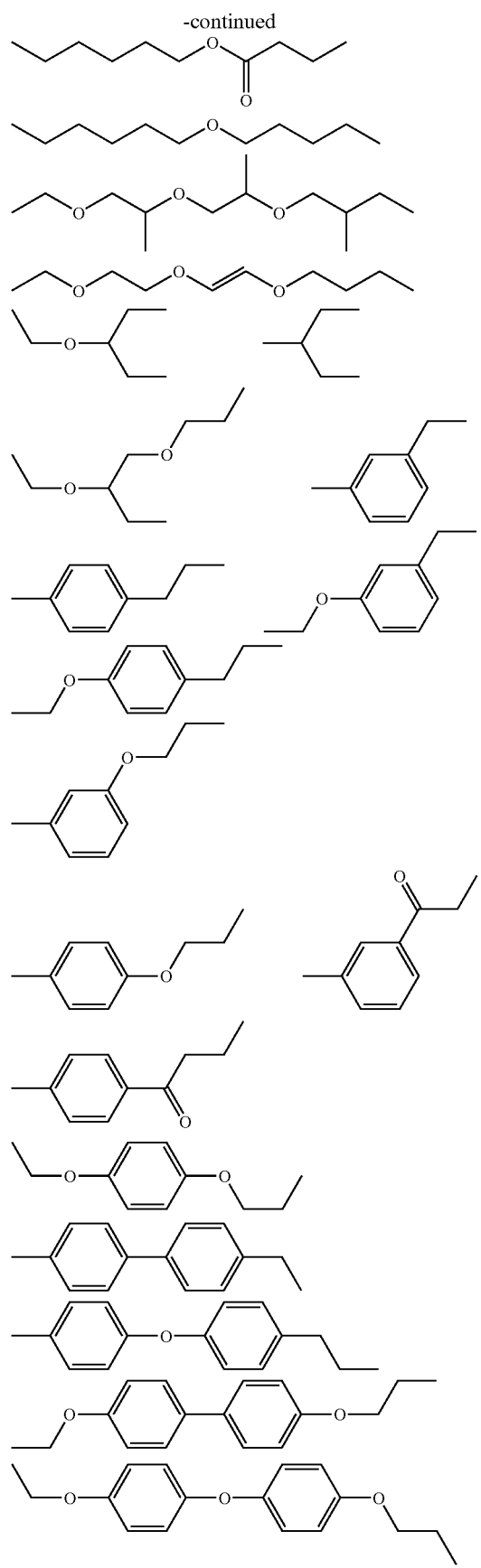
-continued
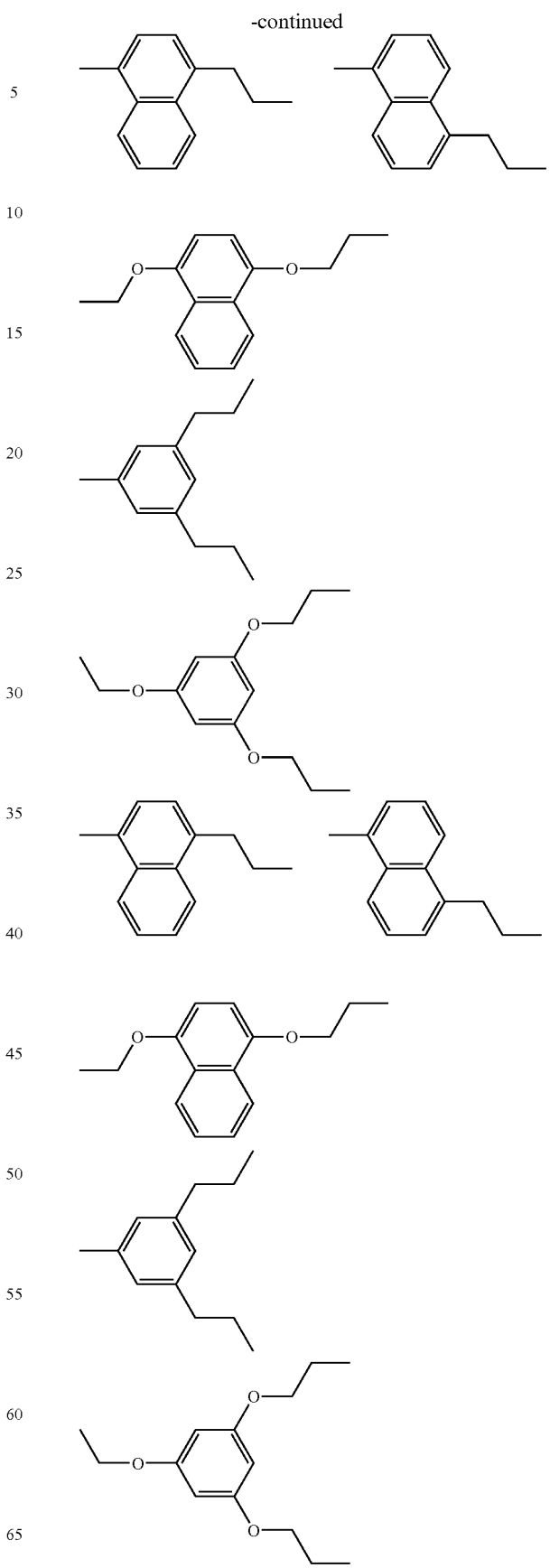

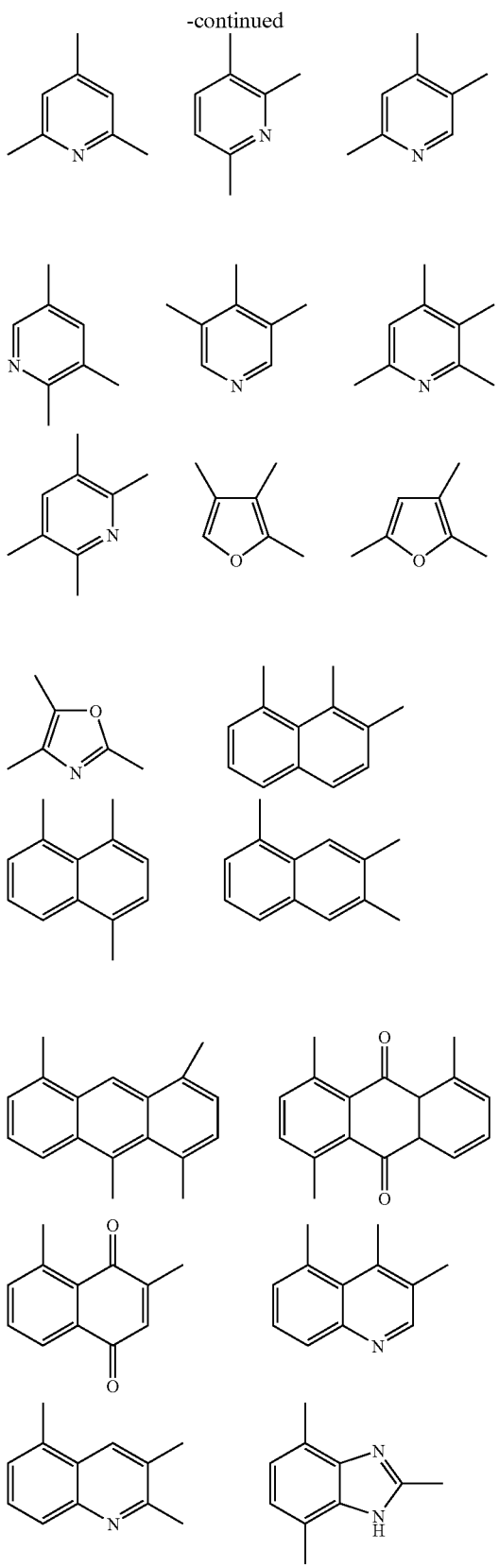

An (α-lower alkyl)polyacrylate represented by formula (VIII) shown below is particularly preferred.

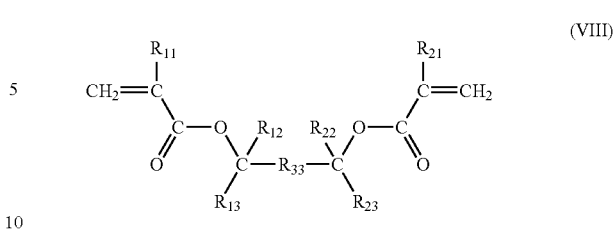

In formula (VIII), $R_{11}$ and $R_{21}$, each represents, independently, a hydrogen atom or a lower alkyl group, $R_{12}$, $R_{13}$, $R_{22}$ and $R_{23}$ each represents, independently, an organic group which is bonded through a carbon atom, and specific examples are the same as those in $R_2$ and $R_3$. $R_{33}$ represents a divalent linking group and includes the same divalent linking groups among the linking groups listed above.

Specific examples of the (α-lower alkyl)polyacrylate having at least two partial structures represented by formula (VII) include the compounds shown below.

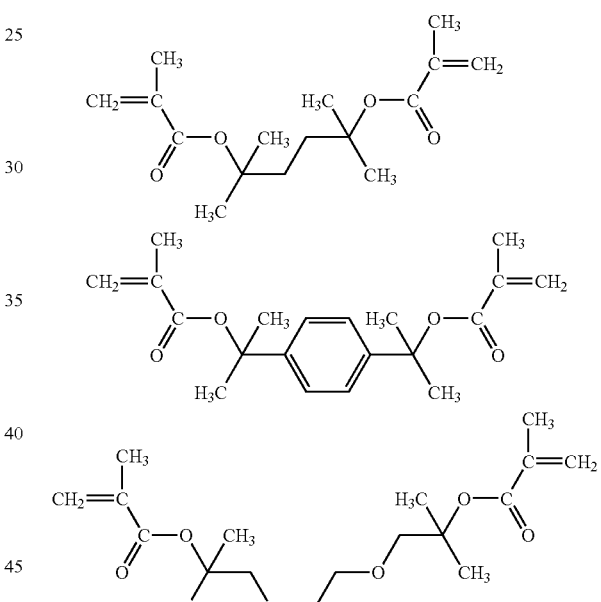

In the acrylic acid-based polymer of the present invention, there are no particular restrictions on the ratio of the arm portion to the core portion. The content of the repeating unit of the arm portion derived from the acrylic ester moiety represented by formula (I) in the entire polymer is preferably 70 mol % or more, more preferably from 70 to 95 mol %, and still more preferably from 80 to 95 mol %.

In the case of using a repeating unit derived from an acrylic ester represented by formula (I) and a repeating unit derived from the polyacrylate as the core portion, the total content of repeating units in the entire polymer is preferably 5 mol % or more, more preferably from 5 to 60 mol %, and still more preferably from 10 to 40 mol %. The content of the repeating unit derived from the acrylic ester represented by formula (I) in the entire polymer is preferably 1 mol % or more, more preferably from 1 to 50 mol %, still more preferably from 1 to 20 mol %, and particularly preferably from 1 to 15 mol %, in view of an improvement in solubility in the solvent.

The ratio of the weight average molecular weight (Mw) of the star polymer of the present invention to the number average molecular weight (Mn) of the star polymer of the present invention, (Mw/Mn), is preferably within a range from 1.00 to 1.50, and the number average molecular weight is preferably within a range from 5,000 to 100,000.

The acrylic acid-based polymer of the present invention preferably contains no benzene ring. The use of the acrylic acid-based polymer as an ArF resist material becomes advantageous when no benzene ring is contained. For example, in the case of forming a resist pattern using an ArF excimer laser (193 nm), resolution can be improved because of excellent transparency at about 193 nm.

The acrylic acid-based polymer of the present invention is preferably a star polymer including a polymer chain having a repeating unit derived from the acrylic ester represented by formula (I) as the arm portion, and a polymer chain having a repeating unit derived from the polyacrylate as the core portion. There are no particular restrictions on the shape and the polymer may have a chain structure or a network structure. Even in the case of a polymer other than the star polymer, the repeating unit to be used as a constituent unit may be the same as those described above.

The method for producing the acrylic acid-based copolymer or star polymer of the present invention is preferably an anionic polymerization method which can easily control a reaction rate and a stereostructure of a polymer, and thus the star polymer described above can be easily produced. Examples of the method for producing a star polymer of the present invention include (1) a method in which an acrylic ester containing an alicyclic skeleton and a lactone ring is anionically polymerized in the presence of an anionic polymerization initiator, thereby synthesizing an arm polymer and then the arm polymer is reacted with a polyfunctional coupling agent serving as a core portion such as a polyacrylate (arm-first method), (2) a method in which a polyacrylate is reacted in the presence of an anionic polymerization initiator to form a polyfunctional core and then methacrylate containing an alicyclic skeleton and a lactone ring is anionically polymerized (core-first method), and (3) a method in which an acrylic ester containing an alicyclic skeleton and a lactone ring is anionically polymerized in the presence of an anionic polymerization initiator, thereby synthesizing an arm polymer, and then the arm polymer is reacted with a polyfunctional coupling agent and an anionically polymerizable monomer is reacted. Of these methods, the methods (1) and (3) are preferred so as to produce a star polymer having a controlled structure because these methods can easily control the reaction.

In the production of an acrylic acid-based polymer having a low molecular weight and narrow molecular weight distribution, which forms the arm portion of the star polymer of the present invention, it is preferred that an oligomer having a polymerization active end, which is an oligomer higher than an average 1.0-mer and lower than an average 4.0-mer or an average 4.0-mer, is formed from a monomer and polymerization is conducted using the oligomer having a polymerization active end as an initiating species. There are no particular restrictions on the monomer so long as it has a structure which does not inhibit living polymerization and specific examples include acrylic esters having a structure which does not inhibit living polymerization. According to such a method, a raw oligomer having a polymerization active end, which is an oligomer higher than an average 1.0-mer and lower than an average 4.0-mer or an average 4.0-mer, is once formed from a monomer. Therefore, initiator efficiency becomes clear and also the amount of a reaction initiating active species can be decided, and thus it becomes easy to perform molecular control of a polymer and a polymer having a uniform molecular weight can be produced.

The polymerization reaction for synthesis of an arm polymer in the method (1) or (3) can be conducted by any of a method of dropping an anionic polymerization initiator in a monomer (mixed) solution, and a method of dropping a monomer (mixed) solution in a solution containing an anionic polymerization initiator. However, the method of dropping a monomer (mixed) solution in a solution containing an anionic polymerization initiator is preferred because the molecular weight and the molecular weight distribution can be controlled. The reaction for synthesis of an arm polymer is usually conducted under an atmosphere of an inert gas such as nitrogen or argon in an organic solvent at a temperature within a range from −100 to 50° C., and preferably from −100 to 40° C.

Examples of the organic solvent used in the synthesis reaction of the arm polymer include organic solvents which are usually used in anionic polymerization, for example, aliphatic hydrocarbons such as n-hexane and n-heptane; alicyclic hydrocarbons such as cyclohexane and cyclopentane; aromatic hydrocarbons such as benzene and toluene; ethers such as diethylether, tetrahydrofuran (THF), and dioxane; anisole and hexamethylphospholamide. These organic solvents can be used alone, or used in combination as a mixed solvent of two or more kinds thereof. Of these organic solvents, mixed solvents such as tetrahydrofuran and toluene, tetrahydrofuran and hexane, and tetrahydrofuran and methylcyclohexane are preferred in view of polarity and solubility.

The polymerization initiator to be used includes, for example, an alkali metal or an organic alkali metal. Examples of the alkali metal include lithium, sodium, potassium, cesium, and sodium-potassium alloy. As the organic alkali metal, an alkylate, an allylate, and an arylate of the alkali metal can be used, and specific examples include ethyl lithium, n-butyl lithium, sec-butyl lithium, t-butyl lithium, ethyl sodium, lithium biphenyl, lithium naphthalene, lithium triphenyl, sodium naphthalene, potassium naphthalene, α-methylstyrene sodium dianion, 1,1-diphenylhexyl lithium, 1,1-diphenyl-3-methylpentyl lithium, 1,1-diphenylmethyl potassium, 1,4-dilithio-2-butene, 1,6-dilithiohexane, polystyryl lithium, cumyl potassium, and cumyl cesium. These compounds can be used alone or in combination.

Examples of the mineral acid in a mineral acid salt of an alkali metal or an alkali earth metal used in the present invention include sulfuric acid, nitric acid, boric acid, hydrochloric acid, hydrobromic acid, hydroiodic acid, hydrobromic acid, perchloric acid, and carbonic acid, of which hydrochloric acid, hydrobromic acid, hydroiodic acid, hydrobromic acid, and perchloric acid are preferred, and hydrochloric acid is more preferred.

Specific examples of the alkali metal and the alkali earth metal include sodium, potassium, lithium, barium, and magnesium.

The mineral acid salt of the alkali metal or the alkali earth metal is preferably a halide of the alkali metal or the alkali earth metal. Specific examples include lithium chloride, lithium bromide, lithium iodide, lithium fluoride, sodium bromide, magnesium chloride, potassium chloride, and potassium bromide, of which lithium chloride is preferably used. It is also possible to use a chloride, a bromide, and an iodide of barium, lithium borate, and magnesium nitrate.

The amount is preferably 0.1 equivalents or more, and less than 1 equivalent, more preferably from 0.15 to 0.7 equivalents, and particularly preferably from 0.20 to 0.55 equivalents in terms of a molar ratio based on the anionic polymerization initiator. When the amount is less than 0.1 equivalents, the polymerization reaction cannot be controlled and a polymer having narrow molecular weight distribution cannot be obtained. In contrast, when the amount is more than 1 equivalent, initiator efficiency drastically decreases and thus it becomes difficult to control the molecular weight. The mineral acid salt of the alkali metal or the alkali earth metal can be added to the anionic polymerization initiator after mixing with a monomer. It is preferred to preliminarily mix with the anionic polymerization initiator before adding the monomer.

As described above, there are no particular restrictions on the polymerization form of the arm polymer, and examples include a random copolymer in which the respective components are statistically distributed in the entire copolymer chain, a partial block copolymer, and a complete block copolymer. These copolymers can be synthesized by selecting a method of adding acrylic esters to be used.

The reaction, which enables production of a star polymer using the arm polymer thus obtained as a branched polymer chain, can be conducted by adding the polyacrylate in the reaction solution after the completion of the reaction for synthesis of an arm polymer. In this reaction, when the polymerization reaction is conducted under an atmosphere of an inert gas such as nitrogen or argon in an organic solvent at a temperature within a range from −100 to 50° C., and preferably from −70 to 40° C., the structure is controlled and a polymer having narrow molecular weight distribution can be obtained. The reaction for production of a star polymer can be continuously conducted in the solvent used to form an arm polymer, and also can be conducted by adding a solvent thereby changing the composition, or replacing the solvent with another solvent. As the solvent, the same solvents as those used in the reaction for synthesis of the arm polymer can be used.

In the method for producing a star polymer of the present invention, the molar ratio of the polyacrylate (P) to an active end (D) of a polymer chain obtained by polymerizing an acrylic ester containing an alicyclic skeleton and a lactone ring through an anionic polymerization method using an anionic polymerization initiator as a polymerization initiator, [(P)/(D)], is preferably controlled within a range from 0.1 to 10. In the reaction of the arm polymer chain and the polyacrylate, any of a method of adding a polyacrylate to an arm polymer chain containing an active end, and a method of adding an arm polymer chain having an active end to the polyacrylate can be used.

According to the method (3) in which an arm polymer chain prepared preliminarily is reacted with a polyacrylate to form a polyfunctional core having an active end, and the polyfunctional core is reacted with an anionic polymerizable monomer to form a new arm polymer chain, star polymers each containing a different arm polymer chain can be produced. Reacting a monomer capable of directly reacting with the active end existing in a core is also possible. When a compound such as diphenylethylene or stilbene is reacted and a mineral acid salt of an alkali metal or an alkali earth metal, such as lithium chloride is added, and then a monomer is reacted, it is possible to allow the polymerization reaction to proceed slowly in the case of reacting a monomer having high reactivity such as an acrylic acid derivative, and thus it is sometimes advantageous so as to control the entire structure of the obtained star polymer. The reaction can be continuously conducted in a solvent used to form a core having an active end, and also the composition can be changed by adding a solvent, or the solvent can be replaced with another solvent. Examples of the solvent include the same solvents as those used to synthesize an arm polymer. By mixing two kinds of monomers as the arm polymer chain introduced into an active end existing in a core in the method (3) or the arm polymer chain in the method (2) and reacting them, a random copolymerized polymer chain can be obtained. Also, a block polymer chain can be obtained by sequentially adding two kinds of monomers. Also, a functional group can be introduced into the end by adding carbon dioxide and epoxy after the completion of the reaction.

As described above, by copolymerizing an acrylic ester represented by formula (I) containing an organic group having a polar group such as a hydroxyl group and/or a carboxyl group as is, an acrylic acid-based polymer of the present invention (star polymer) containing a organic group having a hydroxyl group and/or a carboxyl group can be produced. Since it is possible to allow the anionic polymerization to proceed smoothly, in anionic polymerization, the acrylic acid-based polymer of the present invention is preferably produced by protecting a hydroxyl group and/or a carboxyl group in an acrylic ester represented by formula (I) with a protective group, followed by polymerization and further deprotection. Specifically, an acrylic acid-based copolymer (star polymer) containing an organic group having a hydroxyl group and/or a carboxyl group is produced by dissolving the acrylic ester represented by formula (I), containing an organic group having a hydroxyl group and/or a carboxyl group in a solvent, adding a compound capable of forming a protective group, such as acetal, protecting a hydroxyl group, performing polymerization, polymerizing with a polyfunctional coupling agent such as a polyacrylate, and adding an acid, thereby performing deprotection.

There are no particular restrictions on the method for producing a polymer of the present invention so long as it is a method for producing a polymer through living polymerization in which an oligomer having a polymerization active end, which is an oligomer higher than an average 1.0-mer and lower than an average 4.0-mer or an average 4.0-mer, and polymerization can be conducted using the oligomer having a polymerization active end as an initiating species. The polymerization method may be any polymerization method such as radical polymerization, cationic polymerization, and anionic, of which an anionic polymerization method is particularly preferred.

The oligomer, which is an oligomer higher than an average 1.0-mer and lower than an average 4.0-mer or an average 4.0-mer, means an oligomer, which is an oligomer higher than an mole average 1.0-mer and lower than an mole average 4.0-mer or an mole average 4.0-mer, and refers to a value obtained by gel permeation chromatography. In the oligomer having a polymerization active end, which is an oligomer higher than an average 1.0-mer and lower than an average 4.0-mer or an average 4.0-mer, the content of 1- to 5-mer is 90 mol % or more, preferably 95 mol %, and particularly preferably 100 mol %. In view of easiness and certainty in the case of forming a raw oligomer having a polymerization active end, it is preferred to form a raw oligomer having a polymerization active end of dimer or trimer, that is, a raw oligomer having a polymerization active end of preferably from average 1.5 to 4.0-mer more preferably from average 1.5 to 3.5-mer, and more preferably from average 2 to 3.5. Taking account of approaching the initial polymer number so as to regulate growth reaction, for example, the content of the dimer or trimer is preferably 50 mol % or more, more preferably 60 mol %, and particularly preferably 70 mol % or more.

In the method of the present invention, it is preferred to allow the monomer to disappear in the stage of forming an oligomer having a polymerization active end. When the monomer disappears, the amount of the initiating species can be surely confirmed. Disappearance of the monomer can be confirmed, for example, by gas chromatography (GC). In the stage of forming an oligomer having a polymerization active end, it is preferred to allow the monomer and 1-mer having a polymerization active end to disappear. That is, addition of the monomer in an amount which enables conversion of the entire raw monomer into a dimer or higher oligomer, and disappearance of a raw monomer and 1-mer having a polymerization active end enables understanding of the polymer number and the amount of the initiating species.

Also, the monomer may be added in a single portion to form an oligomer having a polymerization active end, and the monomer is preferably added in at least two portions to form an oligomer having a polymerization active end. Consequently, in a prestage (for example, first stage), the monomer is added in an amount, which is smaller than that to be added finally in an oligomer forming stage, and an active amount (activation efficiency) of an initiator can be confirmed, and thus it becomes possible to adjust the amount of the monomer to be added. Usually, catalytic efficiency is likely to vary with polymerization conditions and the activation efficiency may sometimes become higher or lower unexpectedly. However, it is possible to cope with such a case. Even if the activation efficiency is high unexpectedly, it is possible to surely allow the monomer (and 1-mer having a polymerization active end) to disappear in the following stage.

Also, formation of the above oligomer having a polymerization active end and/or reaction for polymerization with other raw materials are usually conducted under an atmosphere of an inert gas such as nitrogen or argon in an organic solvent at a temperature of preferably −20° C. or lower, more preferably −25° C. or lower, and still more preferably from −70 to −30°. Thus, it enables the reaction to proceed certainly.

There are no particular restrictions on the monomer used in the method of the present invention so long as it is a monomer which can be subjected to living polymerization, and examples include ethylene, styrene, butadiene, vinyl chloride, vinyl acetate, (α-lower alkyl)acrylic acid, (α-lower alkyl)methyl acrylate, methyl vinyl ketone, (α-lower alkyl) acrylamide, (α-lower alkyl)acrylnitrile, vinylidene chloride, and (α-lower alkyl)acrylic ester. (α-lower alkyl)acrylic acid has the same meaning as that of the (α-lower alkyl)acrylic ester.

The present invention will now be described in detail by way of examples, but the scope of the present invention is not limited to the following examples.

SYNTHESIS EXAMPLE 1

Under a nitrogen atmosphere, 23.6 g (0.1 mols) of 1-hydroxy-3-methacryloyloxyadamantane (HAMA) was dissolved in 100 ml of tetrahydrofuran (THF) and 21.6 g (0.3 mols) of vinyl ethyl ether and 0.1 ml (1 mmol) of hydrochloric acid were added, followed by stirring at room temperature for 3 days. The reaction solution was neutralized with an aqueous $Na_2CO_3$ solution added and, after phase separation, the upper layer was washed with water so as to adjust the pH to 7. $MgSO_4$ was added and the solution was dehydrated and filtered, and then concentrated to dryness to obtain 30 g of 1-(1'-ethoxyethoxy)-3-methacryloyloxyadamantane (EEAM) (yield: 99%)

EXAMPLE 1

Under a nitrogen atmosphere, 360 g of THF containing 8 mmols of lithium chloride was maintained at −40° C. Under stirring, 14 mmols of sec-butyl lithium (SBL) was added and 25 g of a THF solution containing 33 mmols of 1-(1-methacryloyloxy-1-methylethyl)adamantane (IAMA) was added dropwise, and then the reaction was continued for 30 minutes. A small amount of the reaction solution was taken out from the reaction system, and it was confirmed that an IAMA monomer has been consumed using gas chromatography (hereinafter abbreviated to GC). Then, 78 g of a THF solution containing 45 mmols of IAMA, 89 mmols of a mixture of (±)-octahydro-3-oxo-4,7-methanoisobenzofuran-5-yl methacrylate and (±)-octahydro-1-oxo-4,7-methanoisobenzofuran-5-yl methacrylate as a position isomer thereof (TLMA), 11 mmols of EEAM and 20 mmols of tert-butyl methacrylate (tBMA) was added dropwise and the reaction was continued for 30 minutes. A small amount of the reaction solution was taken out from the reaction system. GC analysis revealed that monomers have been completely consumed.

Then, 14 g of a THF solution containing 25 mmols of 2,5-dimethyl-2,5-hexanediol dimethacrylate (MDMA) was added dropwise and the reaction was continued for 30 minutes. A small amount of the reaction solution was taken out from the reaction system. GC analysis revealed that the MDMA monomer has been completely consumed, and the reaction was terminated by the THF solution containing hydrochloric acid. The reaction terminating solution was poured into a large amount of methanol, thereby precipitating a polymer, followed by filtration, washing and further drying under reduced pressure to obtain 54 g of a white powdered star polymer. GPC analysis of the resulting polymer revealed that a star polymer moiety has a Mw of 28,500, a Mw/Mn of 1.25 and an area of 55%, and an arm polymer moiety has a Mw of 3,700, a Mw/Mn of 1.22 and an area of 45%.

Then, 54 g of the resulting polymer was dissolved in THF to obtain a 30% solution, and 2 g of 3% hydrochloric acid was added and the reaction was conducted at room temperature for one hour. The reaction solution was poured into a large amount of methanol, thereby precipitating a polymer, followed by filtration, washing and further drying under reduced pressure to obtain 53 g of a white powdered star polymer. GPC analysis of the resulting polymer revealed that a star polymer moiety has a Mw of 28,300, a Mw/Mn of 1.25 and an area of 55%, and an arm polymer moiety has a Mw of 3,600, a Mw/Mn of 1.22 and an area of 45%. $^{13}C$-NMR revealed that the deethoxyethoxylation reaction has completed because a signal at 93 ppm attributed to an ethoxyethoxy group disappeared. The measurement of $^{13}C$-NMR revealed that the polymer has a composition ratio of IAMA:HAMA:TLMA: tBMA:MDMA=35:5:40:9:11 (molar ratio).

The above results revealed that the reaction and the following elimination reaction have been conducted as aimed and that a star polymer comprising an arm portion made of IAMA/HAMA/TLMA/tBMA and a core portion made of MDMA.

EXAMPLE 2

Under a nitrogen atmosphere, 310 g of THF containing 10 mmols of lithium chloride was maintained at −40° C. Under stirring, 19 mmols of SBL was added and 20 g of a THF solution containing 27 mmols of IAMA was added dropwise, and then the reaction was continued for 30 minutes. A small amount of the reaction solution was taken out from the reaction system, and it was confirmed that an IAMA monomer has been consumed using GC. Then, 65 g of a THF solution containing 30 mmols of IAMA, 76 mmols of TLMA, 19 mmols of EEAM and 7 mmols of tBMA was added dropwise and the reaction was continued for 30 minutes. A small amount of the reaction solution was taken out from the reaction system. GC analysis revealed that monomers have been completely consumed.

Then, 16 g of a THF solution containing 29 mmols of MDMA was added dropwise and the reaction was continued for 30 minutes. A small amount of the reaction solution was taken out from the reaction system. GC analysis revealed that the MDMA monomer has been completely consumed, and the reaction was terminated by the THF solution containing hydrochloric acid. The reaction terminating solution was poured into a large amount of ethanol, thereby precipitating a polymer, followed by filtration, washing and further drying under reduced pressure to obtain 47 g of a white powdered star polymer. GPC analysis of the resulting polymer revealed that a star polymer moiety has a Mw of 29,000, a Mw/Mn of 1.34 and an area of 57%, and an arm polymer moiety has a Mw of 2,900, a Mw/Mn of 1.22 and an area of 43%.

Then, 47 g of the resulting polymer was dissolved in THF to obtain a 30% solution, and 2 g of 3% hydrochloric acid was added and the reaction was conducted at room temperature for one hour. The reaction solution was poured into a large amount of methanol, thereby precipitating a polymer, followed by filtration, washing and further drying under reduced pressure to obtain 46 g of a white powdered star polymer. GPC analysis of the resulting polymer revealed that a star polymer moiety has a Mw of 29,300, a Mw/Mn of 1.33 and an area of 58%, and an arm polymer moiety has a Mw of 2,800, a Mw/Mn of 1.21 and an area of 42%. $^{13}$C-NMR revealed that the deethoxyethoxylation reaction has completed because a signal at 93 ppm attributed to an ethoxyethoxy group disappeared. The measurement of $^{13}$C-NMR revealed that the polymer has a composition ratio of IAMA:HAMA:TLMA: tBMA:MDMA=30:10:40:4:16 (molar ratio). The above results revealed that the reaction and the following elimination reaction have been conducted as aimed and that a star polymer comprising an arm portion made of IAMA/HAMA/TLMA/tBMA and a core portion made of MDMA.

EXAMPLE 3

Under a nitrogen atmosphere, 320 g of THF containing 10 mmols of lithium chloride was maintained at −40° C. Under stirring, 19 mmols of SBL was added and 20 g of a THF solution containing 27 mmols of IAMA was added dropwise, and then the reaction was continued for 30 minutes. A small amount of the reaction solution was taken out from the reaction system, and it was confirmed that an IAMA monomer has been consumed using GC. Then, 67 g of a THF solution containing 30 mmols of IAMA, 76 mmols of TLMA, 28 mmols of EEAM and 7 mmols of tBMA was added dropwise and the reaction was continued for 30 minutes. A small amount of the reaction solution was taken out from the reaction system. GC analysis revealed that monomers have been completely consumed.

Then, 16 g of a THF solution containing 29 mmols of MDMA was added dropwise and the reaction was continued for 30 minutes. A small amount of the reaction solution was taken out from the reaction system. GC analysis revealed that the MDMA monomer has been completely consumed, and the reaction was terminated by the THF solution containing hydrochloric acid. The reaction terminating solution was poured into a large amount of methanol, thereby precipitating a polymer, followed by filtration, washing and further drying under reduced pressure to obtain 48 g of a white powdered star polymer. GPC analysis of the resulting polymer revealed that a star polymer moiety has a Mw of 26,000, a Mw/Mn of 1.30 and an area of 58%, and an arm polymer moiety has a Mw of 2,900, a Mw/Mn of 1.22 and an area of 43%.

Then, 48 g of the resulting polymer was dissolved in THF to obtain a 30% solution, and 2 g of 3% hydrochloric acid was added and the reaction was conducted at room temperature for one hour. The reaction solution was poured into a large amount of methanol, thereby precipitating a polymer, followed by filtration, washing and further drying under reduced pressure to obtain 46 g of a white powdered star polymer. GPC analysis of the resulting polymer revealed that a star polymer moiety has a Mw of 25,900, a Mw/Mn of 1.29 and an area of 58%, and an arm polymer moiety has a Mw of 2,800, a Mw/Mn of 1.22 and an area of 42%. $^{13}$C-NMR revealed that the deethoxyethoxylation reaction has completed because a signal at 93 ppm attributed to an ethoxyethoxy group disappeared. The measurement of $^{13}$C-NMR revealed that the polymer has a composition ratio of IAMA:HAMA:TLMA: tBMA:MDMA=30:15:35:4:16 (molar ratio). The above results revealed that the reaction and the following elimination reaction have been conducted as aimed and that a star polymer comprising an arm portion made of IAMA/HAMA/TLMA/tBMA and a core portion made of MDMA.

EXAMPLE 4

Under a nitrogen atmosphere, 310 g of THF containing 7 mmols of lithium chloride was maintained at −40° C. Under stirring, 14 mmols of SBL was added and 12 g of a THF solution containing 31 mmols of 1-ethyl-1-cyclohexyl methacrylate (ECHMA) was added dropwise, and then the reaction was continued for 30 minutes. A small amount of the reaction solution was taken out from the reaction system, and it was confirmed that an ECHMA monomer has been consumed using GC. Then, 68 g of a THF solution containing 42 mmols of ECHMA, 84 mmols of TLMA, 10 mmols of EEAM and 19 mmols of tBMA was added dropwise and the reaction was continued for 30 minutes. A small amount of the reaction solution was taken out from the reaction system. GC analysis revealed that monomers have been completely consumed.

Then, 13 g of a THF solution containing 23 mmols of MDMA was added dropwise and the reaction was continued for 30 minutes. A small amount of the reaction solution was taken out from the reaction system. GC analysis revealed that the MDMA monomer has been completely consumed, and the reaction was terminated by the THF solution containing hydrochloric acid. The reaction terminating solution was poured into a large amount of methanol, thereby precipitating a polymer, followed by filtration, washing and further drying under reduced pressure to obtain 46 g of a white powdered star polymer. GPC analysis of the resulting polymer revealed that a star polymer moiety has a Mw of 23,000, a Mw/Mn of 1.24 and an area of 61%, and an arm polymer moiety has a Mw of 3,500, a Mw/Mn of 1.22 and an area of 39%.

Then, 46 g of the resulting polymer was dissolved in THF to obtain a 30% solution, and 2 g of 3% hydrochloric acid was added and the reaction was conducted at room temperature for one hour. The reaction solution was poured into a large amount of methanol, thereby precipitating a polymer, followed by filtration, washing and further drying under reduced pressure to obtain 45 g of a white powdered star polymer. GPC analysis of the resulting polymer revealed that a star polymer moiety has a Mw of 22,700, a Mw/Mn of 1.23 and an area of 61%, and an arm polymer moiety has a Mw of 3,400, a Mw/Mn of 1.22 and an area of 39%. $^{13}$C-NMR revealed that the deethoxyethoxylation reaction has completed because a signal at 93 ppm attributed to an ethoxyethoxy group disappeared. The measurement of $^{13}$C-NMR revealed that the polymer has a composition ratio of ECHMA:HAMA:TLMA:tBMA:MDMA=35:5:40:9:11 (molar ratio). The above results revealed that the reaction and the following elimination reaction have been conducted as aimed and that a star polymer comprising an arm portion made of ECHMA/HAMA/TLMA/tBMA and a core portion made of MDMA.

EXAMPLE 5

Under a nitrogen atmosphere, 320 g of THF containing 8 mmols of lithium chloride was maintained at −40° C. Under stirring, 15 mmols of SBL was added and 13 g of a THF solution containing 33 mmols of ECHMA was added dropwise, and then the reaction was continued for 30 minutes. A small amount of the reaction solution was taken out from the reaction system, and it was confirmed that an ECHMA monomer has been consumed using GC. Then, 75 g of a THF solution containing 44 mmols of ECHMA, 88 mmols of TLMA, 22 mmols of EEAM and 9 mmols of tBMA was added dropwise and the reaction was continued for 30 minutes. A small amount of the reaction solution was taken out from the reaction system. GC analysis revealed that monomers have been completely consumed.

Then, 14 g of a THF solution containing 24 mmols of MDMA was added dropwise and the reaction was continued for 30 minutes. A small amount of the reaction solution was taken out from the reaction system. GC analysis revealed that the MDMA monomer has been completely consumed, and the reaction was terminated by the THF solution containing hydrochloric acid. The reaction terminating solution was poured into a large amount of methanol, thereby precipitating a polymer, followed by filtration, washing and further drying under reduced pressure to obtain 50 g of a white powdered star polymer. GPC analysis of the resulting polymer revealed that a star polymer moiety has a Mw of 24,700, a Mw/Mn of 1.24 and an area of 58%, and an arm polymer moiety has a Mw of 3,300, a Mw/Mn of 1.20 and an area of 42%.

Then, 50 g of the resulting polymer was dissolved in THF to obtain a 30% solution, and 2 g of 3% hydrochloric acid was added and the reaction was conducted at room temperature for one hour. The reaction solution was poured into a large amount of methanol, thereby precipitating a polymer, followed by filtration, washing and further drying under reduced pressure to obtain 48 g of a white powdered star polymer. GPC analysis of the resulting polymer revealed that a star polymer moiety has a Mw of 24,200, a Mw/Mn of 1.24 and an area of 58%, and an arm polymer moiety has a Mw of 3,300, a Mw/Mn of 1.20 and an area of 42%. $^{13}$C-NMR revealed that the deethoxyethoxylation reaction has completed because a signal at 93 ppm attributed to an ethoxyethoxy group disappeared. The measurement of $^{13}$C-NMR revealed that the polymer has a composition ratio of ECHMA:HAMA:TLMA:tBMA:MDMA=35:10:40:4:11 (molar ratio). The above results revealed that the reaction and the following elimination reaction have been conducted as aimed and that a star polymer comprising an arm portion made of ECHMA/HAMA/TLMA/tBMA and a core portion made of MDMA.

EXAMPLE 6

Under a nitrogen atmosphere, 320 g of THF containing 7 mmols of lithium chloride was maintained at −40° C. Under stirring, 14 mmols of sec-butyl lithium (SBL) was added and 10 g of a THF solution containing 25 mmols of 1-ethyl-1-cyclohexyl methacrylate (ECHMA) was added dropwise, and then the reaction was continued for 30 minutes. A small amount of the reaction solution was taken out from the reaction system, and it was confirmed that an ECHMA monomer has been consumed using GC. GPC analysis revealed that the reaction solution is an average 2.5-mer. Then, 2 g of a THF solution containing 5 mmols of ECHMA was added dropwise, and then the reaction was continued for 30 minutes. A small amount of the reaction solution was taken out from the reaction system, and it was confirmed that an ECHMA monomer has been consumed using GC. GPC analysis revealed that the reaction solution is an average 3-mer. Then, 66 g of a THF solution containing 41 mmols of ECHMA, 82 mmols of a mixture of (±)-octahydro-3-oxo-4,7-methanoisobenzofuran-5-yl methacrylate and (±)-octahydro-1-oxo-4,7-methanoisobenzofuran-5-yl methacrylate as a position isomer thereof (TLMA), 10 mmols of EEAM and 18 mmols of tert-butyl methacrylate (tBMA) was added dropwise and the reaction was continued for 30 minutes. A small amount of the reaction solution was taken out from the reaction system. GC analysis revealed that monomers have been completely consumed and the reaction was terminated with a THF solution containing hydrochloric acid. The reaction terminating solution was poured into a large amount of methanol, thereby precipitating a polymer, followed by filtration, washing and further drying under reduced pressure to obtain 39 g of a white powdered polymer. GPC analysis of the resulting polymer revealed that the white powdered polymer has a Mw of 2,800 and a Mw/Mn of 1.14.

Then, 39 g of the resulting polymer was dissolved in THF to obtain a 30% solution, and 2 g of 3% hydrochloric acid was added and the reaction was conducted at room temperature for one hour. The reaction solution was poured into a large amount of methanol, thereby precipitating a polymer, followed by filtration, washing and further drying under reduced pressure to obtain 38 g of a white powdered polymer. GPC analysis of the resulting polymer revealed that the polymer moiety has a Mw of 2,700 and a Mw/Mn= of 1.14. $^{13}$C-NMR revealed that the deethoxyethoxylation reaction has completed because a signal at 93 ppm attributed to an ethoxyethoxy group disappeared. The measurement of $^{13}$C-NMR revealed that the polymer has a composition ratio of ECHMA:HAMA:TLMA:tBMA=39:6:45:9 (molar ratio). The above results revealed that the reaction and the following elimination reaction have been conducted as aimed and that an ECHMA/HAMA/TLMA/tBMA copolymer has been produced.

EXAMPLE 7

Under a nitrogen atmosphere, 330 g of THF containing 8 mmols of lithium chloride was maintained at −40° C. Under stirring, 16 mmols of SBL was added and 10 g of a THF solution containing 25 mmols of ECHMA was added dropwise, and then the reaction was continued for 30 minutes. A small amount of the reaction solution was taken out from the reaction system, and it was confirmed that an ECHMA monomer has been consumed using GC. GPC analysis revealed that the reaction solution is an average 2.5-mer. Then, 2 g of a THF solution containing 5 mmols of ECHMA was added dropwise and the reaction was continued for 30 minutes. A small amount of the reaction solution was taken out from the reaction system. GC analysis revealed that the ECHMA monomer has been completely consumed and GPC analysis revealed that the reaction solution is an average 3-mer. Then, 84 g of a THF solution containing 51 mmols of ECHMA, 82 mmols of TLMA and 41 mmols of EEAM was added dropwise and the reaction was continued for 30 minutes. A small amount of the reaction solution was taken out from the reaction system. GC analysis revealed that the ECHMA monomer has been completely consumed and the reaction was terminated with a THF solution containing hydrochloric acid. The reaction terminating solution was poured into a large amount of methanol, thereby precipitating a polymer, followed by filtration, washing and further drying under reduced pressure to obtain 48 g of a white powdered polymer. GPC analysis of the resulting polymer revealed that the white powdered polymer has a Mw of 3,500 and a Mw/Mn of 1.16.

Then, 39 g of the resulting polymer was dissolved in THF to obtain a 30% solution, and 2 g of 3% hydrochloric acid was added and the reaction was conducted at room temperature for one hour. The reaction solution was poured into a large amount of methanol, thereby precipitating a polymer, followed by filtration, washing and further drying under reduced pressure to obtain 36 g of a white powdered polymer. GPC analysis of the resulting polymer revealed that the polymer moiety has a Mw of 3,200 and a Mw/Mn=of 1.15. $^{13}$C-NMR revealed that the deethoxyethoxylation reaction has completed because a signal at 93 ppm attributed to an ethoxyethoxy group disappeared. The measurement of $^{13}$C-NMR revealed that the polymer has a composition ratio of ECHMA:HAMA:TLMA=40:20:40 (molar ratio). The above results revealed that the reaction and the following elimination reaction have been conducted as aimed and that an ECHMA/HAMA/TLMA copolymer has been produced.

EXAMPLE 8

Under a nitrogen atmosphere, 330 g of THF containing 8 mmols of lithium chloride was maintained at −40° C. Under stirring, 16 mmols of sec-butyl lithium (SBL) was added and 10 g of a THF solution containing 25 mmols of 1-ethyl-1-cyclohexyl methacrylate (ECHMA) was added dropwise, and then the reaction was continued for 30 minutes. A small amount of the reaction solution was taken out from the reaction system, and it was confirmed that an ECHMA monomer has been consumed using gas chromatography (hereinafter abbreviated to GC). GPC analysis revealed that the reaction solution is an average 2.5-mer. Then, 2 g of a THF solution containing 5 mmols of ECHMA was added dropwise and the reaction was continued for 30 minutes. A small amount of the reaction solution was taken out from the reaction system. GC analysis revealed that the ECHMA monomer has been completely consumed and GPC analysis revealed that the reaction solution is an average 3-mer. Then, 84 g of a THF solution containing 51 mmols of ECHMA, 82 mmols of a mixture of (±)-octahydro-3-oxo-4,7-methanoisobenzofuran-5-yl methacrylate and (±)-octahydro-1-oxo-4,7-methanoisobenzofuran-5-yl methacrylate as a position isomer thereof (TLMA) and 41 mmols of EEAM was added dropwise and the reaction was continued for 30 minutes. A small amount of the reaction solution was taken out from the reaction system. GC analysis revealed that monomers have been completely consumed and the reaction was terminated with a THF solution containing hydrochloric acid. The reaction terminating solution was poured into a large amount of methanol, thereby precipitating a polymer, followed by filtration, washing and further drying under reduced pressure to obtain 43 g (yield: 100%) of a white powdered polymer. GPC analysis of the resulting polymer revealed that the white powdered polymer has a Mn of 3,100, a Mw of 3,500 and a Mw/Mn of 1.15 with respect to a calculated value Mn of 3,000 calculated from a molar ratio of an initiator to each monomer and a molecular weight. The measurement of $^{13}$C-NMR revealed that the polymer has a composition ratio of ECHMA:EEAM:TLMA=40:20:40 (molar ratio).

The above results revealed that the reaction and the following elimination reaction have been conducted as aimed and shows high initiator efficiency and that an ECHMA/EEAM/TLMA copolymer having narrow molecular weight distribution has been produced.

EXAMPLE 9

Under a nitrogen atmosphere, 300 g of THF containing 120 mmols of lithium chloride was maintained at −40° C. Under stirring, 27 mmols of SBL was added and 10 g of a THF solution containing 40 mmols of ECHMA was added dropwise, and then the reaction was continued for 30 minutes. A small amount of the reaction solution was taken out from the reaction system, and it was confirmed that an ECHMA monomer has been consumed using gas chromatography (hereinafter abbreviated to GC). GPC analysis revealed that the reaction solution is an average 1.7-mer. Then, 3 g of a THF solution containing 6 mmols of ECHMA was added dropwise and the reaction was continued for 30 minutes. A small amount of the reaction solution was taken out from the reaction system. GC analysis revealed that the ECHMA monomer has been completely consumed and GPC analysis revealed that the reaction solution is an average 2-mer. Then, 62 g of a THF solution containing 46 mmols of ECHMA, 92 mmols of TLMA and 46 mmols of EEAM was added dropwise and the reaction was continued for 30 minutes. A small amount of the reaction solution was taken out from the reaction system. GC analysis revealed that monomers have been completely consumed and the reaction was terminated with a THF solution containing hydrochloric acid. The reaction terminating solution was poured into a large amount of methanol, thereby precipitating a polymer, followed by filtration, washing and further drying under reduced pressure to obtain 54 g (yield: 100%) of a white powdered polymer. GPC analysis of the resulting polymer revealed that the white powdered polymer has a Mn of 1,900, a Mw of 2,100 and a Mw/Mn of 1.11 with respect to a calculated value Mn of 2,000 calculated from a molar ratio of an initiator to each monomer and a molecular weight. The measurement of $^{13}$C-NMR revealed that the polymer has a composition ratio of ECHMA:EEAM:TLMA=40:20:40 (molar ratio).

The above results revealed that the reaction and the following elimination reaction have been conducted as aimed and shows high initiator efficiency and that an ECHMA/EEAM/TLMA copolymer having narrow molecular weight distribution has been produced.

EXAMPLE 10

Under a nitrogen atmosphere, 310 g of THF containing 8 mmols of lithium chloride was maintained at −40° C. Under stirring, 16 mmols of SBL was added and 10 g of a THF solution containing 24 mmols of EEAM was added dropwise, and then the reaction was continued for 30 minutes. A small amount of the reaction solution was taken out from the reaction system, and it was confirmed that an EEAM monomer has been consumed using gas chromatography (hereinafter abbreviated to GC). GPC analysis revealed that the reaction solution is an average 2.5-mer. Then, 3 g of a THF solution containing 4 mmols of ECHMA was added dropwise and the reaction was continued for 30 minutes. A small amount of the reaction solution was taken out from the reaction system. GC analysis revealed that the EEAM monomer has been completely consumed and GPC analysis revealed that the reaction solution is an average 3-mer. Then, 84 g of a THF solution containing 76 mmols of ECHMA, 76 mmols of TLMA thereof and 10 mmols of EEAM was added dropwise and the reaction was continued for 30 minutes. A small amount of the reaction solution was taken out from the reaction system. GC analysis revealed that monomers have been completely consumed and the reaction was terminated with a THF solution containing hydrochloric acid. The reaction terminating solution was poured into a large amount of methanol, thereby precipitating a polymer, followed by filtration, washing and further drying under reduced pressure to obtain 48 g (yield: 100%) of a white powdered polymer. GPC analysis of the resulting polymer revealed that the white powdered polymer has a Mn of 3,400, a Mw of 4,000 and a Mw/Mn of 1.16 with respect to a calculated value Mn of 2,800 calculated from a molar ratio of an initiator to each monomer and a molecular weight. The measurement of $^{13}$C-NMR revealed that the polymer has a composition ratio of ECHMA:EEAM:TLMA=40:20:40 (molar ratio).

The above results revealed that the reaction and the following elimination reaction have been conducted as aimed and shows high initiator efficiency and that an ECHMA/EEAM/TLMA copolymer having narrow molecular weight distribution has been produced.

EXAMPLE 11

Under a nitrogen atmosphere, 300 g of THF containing 6 mmols of lithium chloride was maintained at −40° C. Under stirring, 16 mmols of SBL was added and 9 g of a THF solution containing 32 mmols of 1-(1-methacryloxy-1-methylethyl)adamantane (IAMA) was added dropwise, and then the reaction was continued for 30 minutes. A small amount of the reaction solution was taken out from the reaction system, and it was confirmed that an IAMA monomer has been consumed using GC. GPC analysis revealed that the reaction solution is an average 2.5-mer. Then, 5 g of a THF solution containing 4 mmols of IAMA was added dropwise and the reaction was continued for 30 minutes. A small amount of the reaction solution was taken out from the reaction system. GC analysis revealed that the IAMA monomer has been completely consumed and GPC analysis revealed that the reaction solution is an average 3.0-mer. Then, 70 g of a THF solution containing 67 mmols of IAMA, 54 mmols of TLMA and 34 mmols of tBMA was added dropwise and the reaction was continued for 30 minutes. A small amount of the reaction solution was taken out from the reaction system. GC analysis revealed that monomers have been completely consumed. GPC analysis of the resulting polymer revealed that the white powdered polymer has a Mn of 2,800, a Mw of 3,200 and a Mw/Mn of 1.15 with respect to a calculated value Mn of 2,800 calculated from a molar ratio of an initiator to each monomer and a molecular weight.

Then, 20 g of a THF solution containing 36 mmols of 2,5-dimethyl-2,5-hexanediol dimethacrylate (MDMA) was added dropwise and the reaction was continued for 30 minutes. A small amount of the reaction solution was taken out from the reaction system. GC analysis revealed that the MDMA monomer has been completely consumed and the reaction was terminated with a THF solution containing hydrochloric acid. The reaction terminating solution was poured into a large amount of water, thereby precipitating a polymer, followed by filtration, washing and further drying under reduced pressure to obtain a white powdered polymer. The resulting polymer was dissolved again in THF and poured into a large amount of methanol, thereby precipitating a polymer, followed by filtration, washing and further drying under reduced pressure for 10 hours to obtain a white powdered star polymer. GPC analysis of the resulting polymer revealed that a star polymer moiety has a Mw of 32,000, a Mw/Mn of 1.24 and an area of 75%, and an arm polymer moiety has a Mw of 3,000, a Mw/Mn of 1.25 and an area of 25%. The measurement of $^{13}$C-NMR revealed that the polymer has a composition ratio of IAMA:TLMA:tBMA:MDMA=45:24:15:16 (molar ratio).

The above results revealed that the reaction have been efficiently conducted and that a star polymer comprising an arm portion made of IAMA/HAMA/TLMA/tBMA in which an IAMA unit is arranged at an outermost shell, and a core portion made of MDMA.

EXAMPLE 12

Under a nitrogen atmosphere, 300 g of THF containing was maintained at −40° C. Under stirring, was added and 10 g of a THF solution containing 82 mmols of ECHMA, 82 mmols of TLMA and 41 mmols of EEAM was added dropwise, and then the reaction was continued for 30 minutes. A small amount of the reaction solution was taken out from the reaction system, and it was confirmed that the monomers have been completely consumed using GC (hereinafter abbreviated to GC) and the reaction was terminated with a THF solution containing hydrochloric acid. The reaction terminating solution was poured into a large amount of methanol, thereby precipitating a polymer, followed by filtration, washing and further drying under reduced pressure to obtain a white powdered polymer. GPC analysis of the resulting polymer revealed that the white powdered polymer has a Mn of 3,200, a Mw of 3,800 and a Mw/Mn of 1.22 with respect to a calculated value Mn of 1,200 calculated from a molar ratio of an initiator to each monomer and a molecular weight.

As described above, it was confirmed that a copolymer having a low molecular weight and a uniform molecular weight was produced.

The invention claimed is:

1. An acrylic acid-based polymer which is a star polymer, in an arm portion, comprising a repeating unit derived from an (α-lower alkyl)acrylic ester represented by formula (I):

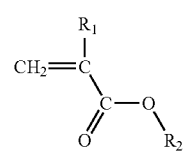

wherein $R_1$ represents a hydrogen atom or a lower alkyl group, and $R_2$ represents an organic group having a polar group, wherein the polar group in $R_2$ of formula (I) is a hydroxyl group, a protected hydroxyl group, a carboxyl group, or an ester group selected from the group consisting of a methoxycarbonyl group, an ethoxycarbonyl group, a phenoxy carbonyl group, a t-butoxycarbonyl group, and a 1-ethoxyethoxycarbonyl group.

2. The acrylic acid-based polymer according to claim 1, wherein $R_2$ of formula (I) is an alicyclic functional group containing a polar group, or a lactone ring-containing functional group containing a polar group.

3. The acrylic acid-based polymer according to claim 1, further comprising a core portion wherein the core portion is a core formed by crosslinking a polyfunctional coupling agent.

4. The acrylic acid-based polymer according to claim 3, wherein the polyfunctional coupling agent is a compound having at least two polymerizable double bonds per molecule.

5. The acrylic acid-based polymer according to claim 3, wherein the polyfunctional coupling agent is a poly($\alpha$-lower alkyl)acrylate.

6. The acrylic acid-based polymer according to claim 1, wherein the polymer constituting the arm portion has a number average molecular weight of 5,000 or less.

7. The acrylic acid-based polymer according to claim 1, wherein the polymer constituting the arm portion has a number average molecular weight of 4,000 or less.

* * * * *